United States Patent
Poteat et al.

(10) Patent No.: US 9,573,714 B2
(45) Date of Patent: Feb. 21, 2017

(54) ELECTRIC MOTOR DRIVEN PUSHERS FOR AUTOMATED CLIPPING PACKAGING APPARATUS

(71) Applicant: Tipper Tie, Inc., Apex, NC (US)

(72) Inventors: William M. Poteat, Fuquay-Varina, NC (US); Samuel D. Griggs, Raleigh, NC (US); Sean Michael Kieffer, Julian, NC (US)

(73) Assignee: Tipper Tie, Inc., Apex, NC (US)

( * ) Notice: Subject to any disclaimer, the term of this patent is extended or adjusted under 35 U.S.C. 154(b) by 129 days.

(21) Appl. No.: 14/519,386

(22) Filed: Oct. 21, 2014

(65) Prior Publication Data

US 2015/0035460 A1   Feb. 5, 2015

Related U.S. Application Data

(62) Division of application No. 13/546,323, filed on Jul. 11, 2012, now Pat. No. 8,950,573.
(Continued)

(51) Int. Cl.

| | |
|---|---|
| *G06F 7/00* | (2006.01) |
| *B65B 25/06* | (2006.01) |
| *G01P 15/00* | (2006.01) |
| *G05B 13/00* | (2006.01) |
| *G05B 11/00* | (2006.01) |

(Continued)

(52) U.S. Cl.
CPC ......... *B65B 25/065* (2013.01); *A22C 17/0093* (2013.01); *B65B 35/20* (2013.01); *B65B 51/04* (2013.01); *B65B 57/00* (2013.01); *B65B 63/026* (2013.01); *B65B 65/02* (2013.01); *G01P 15/00* (2013.01); *G05B 11/00* (2013.01); *G05B 13/00* (2013.01); *G05B 19/042* (2013.01); *B65B 9/15* (2013.01)

(58) Field of Classification Search
CPC .......... G01P 1/026; G01P 1/04; A22C 17/0093
See application file for complete search history.

(56) References Cited

U.S. PATENT DOCUMENTS

| 1,218,314 A | 3/1917 | Read |
|---|---|---|
| 2,029,984 A | 2/1936 | Buttfield et al. |

(Continued)

FOREIGN PATENT DOCUMENTS

| EP | 0 930 236 A1 | 7/1999 |
|---|---|---|
| WO | WO 99/16670 | 4/1999 |
| WO | WO 2011/033931 | 3/2011 |

OTHER PUBLICATIONS

International Search Report and the Written Opinion of the International Searching Authority Corresponding to International Application No. PCT/US2012/046167; Mailed Jan. 29, 2013.
(Continued)

*Primary Examiner* — Prasad Gokhale
(74) *Attorney, Agent, or Firm* — Christensen O'Connor Johnson Kindness PLLC

(57) ABSTRACT

Methods, devices and computer program products automatically package an object, such as, for example, whole muscle meat pieces, in a covering material, such as, for example, netting. The devices include a pusher assembly, an electric motor, preferably a servo motor with a gear box, that drives a linear drive assembly. The devices can include a programmably adjustable index and/or speed profile for the pusher assembly.

20 Claims, 17 Drawing Sheets

Related U.S. Application Data

(60) Provisional application No. 61/507,208, filed on Jul. 13, 2011.

(51) Int. Cl.

| | | |
|---|---|---|
| *B65B 51/04* | (2006.01) | |
| *B65B 57/00* | (2006.01) | |
| *B65B 63/02* | (2006.01) | |
| *B65B 65/02* | (2006.01) | |
| *B65B 35/20* | (2006.01) | |
| *A22C 17/00* | (2006.01) | |
| *G05B 19/042* | (2006.01) | |
| *B65B 9/15* | (2006.01) | |

(56) References Cited

U.S. PATENT DOCUMENTS

| | | | |
|---|---|---|---|
| 2,778,077 A | | 1/1957 | Andrews et al. |
| 2,847,810 A | | 8/1958 | Davey et al. |
| 3,040,654 A | | 6/1962 | Opie |
| 3,389,533 A | | 6/1968 | Tipper et al. |
| 3,447,482 A | | 6/1969 | Jones |
| 3,455,084 A | | 7/1969 | Broersma et al. |
| 3,499,259 A | | 3/1970 | Tipper et al. |
| 3,524,297 A | | 8/1970 | Falborg et al. |
| 3,548,890 A | | 12/1970 | Langen |
| 3,815,323 A | | 6/1974 | Longo |
| 3,854,391 A | | 12/1974 | Ackroyd |
| 3,892,168 A | | 7/1975 | Grobman |
| 3,949,864 A | * | 4/1976 | Montsant .............. B41F 15/085 101/118 |
| 4,036,124 A | * | 7/1977 | Seiler .................... F04B 7/0266 100/185 |
| 4,086,850 A | | 5/1978 | Becker et al. |
| 4,205,604 A | | 6/1980 | Ashley |
| 4,466,532 A | | 8/1984 | Minneman et al. |
| 4,474,284 A | * | 10/1984 | Powell ................... B65G 25/02 198/741 |
| 4,505,003 A | | 3/1985 | Becker et al. |
| 4,516,387 A | | 5/1985 | Kupcikevicius |
| 4,537,006 A | | 8/1985 | Pieri |
| 4,590,748 A | | 5/1986 | Harrison et al. |
| 4,602,472 A | | 7/1986 | Ampolini et al. |
| 4,683,700 A | | 8/1987 | Evans et al. |
| 4,763,777 A | | 8/1988 | Hooper et al. |
| 4,833,863 A | | 5/1989 | Scott et al. |
| 5,042,234 A | | 8/1991 | Evans et al. |
| 5,044,144 A | | 9/1991 | Foote, Jr. et al. |
| 5,092,449 A | * | 3/1992 | Bolin .................... B65G 47/82 198/430 |
| 5,161,347 A | | 11/1992 | May et al. |
| 5,202,135 A | | 4/1993 | Yawn |
| 5,381,725 A | | 1/1995 | Breunig et al. |
| 5,519,985 A | | 5/1996 | Dyck et al. |
| 5,630,697 A | | 5/1997 | Black, Jr. |
| 5,730,277 A | | 3/1998 | Meinke et al. |
| 6,637,178 B1 | | 10/2003 | Cook et al. |
| 6,637,584 B2 | | 10/2003 | Takahashi et al. |
| 6,729,102 B2 | | 5/2004 | Ailey et al. |
| 6,883,297 B2 | | 4/2005 | Kirk et al. |
| 6,976,346 B2 | | 12/2005 | May et al. |
| 7,073,365 B2 | | 7/2006 | Geho et al. |
| 7,237,369 B2 | * | 7/2007 | Griggs ................ A22C 11/125 29/243.56 |
| 7,290,648 B2 | | 11/2007 | Buonomo |
| 7,313,896 B2 | | 1/2008 | Griggs et al. |
| 7,392,635 B2 | * | 7/2008 | May ..................... B65B 39/007 53/138.4 |
| 7,520,107 B2 | * | 4/2009 | Griggs ................ A22C 11/125 53/138.4 |
| 7,870,707 B2 | | 1/2011 | May et al. |
| 7,925,379 B2 | | 4/2011 | May et al. |
| 7,966,714 B2 | | 6/2011 | Dick et al. |
| 7,975,454 B2 | | 7/2011 | May et al. |
| 8,011,167 B2 | | 9/2011 | Griggs et al. |
| 8,100,066 B2 | | 1/2012 | Stein |
| 8,209,945 B2 | | 7/2012 | May et al. |
| 8,256,191 B2 | | 9/2012 | Griggs et al. |
| 8,261,516 B2 | | 9/2012 | Laplace |
| 8,950,573 B2 | | 2/2015 | Poteat et al. |
| 8,950,574 B2 | | 2/2015 | May et al. |
| 2003/0131564 A1 | | 7/2003 | Ailey, Jr. et al. |
| 2005/0034426 A1 | | 2/2005 | Griggs et al. |
| 2006/0021292 A1 | | 2/2006 | Norton et al. |
| 2006/0105690 A1 | | 5/2006 | Wince et al. |
| 2006/0277868 A1 | | 12/2006 | May et al. |
| 2008/0000196 A1 | | 1/2008 | May et al. |
| 2008/0236103 A1 | * | 10/2008 | Lowder ................ A22C 11/00 53/417 |
| 2008/0250755 A1 | | 10/2008 | Griggs et al. |
| 2010/0101187 A1 | | 4/2010 | Laplace |
| 2010/0162668 A1 | | 7/2010 | Cain |
| 2010/0287883 A1 | * | 11/2010 | May ..................... A22C 11/005 53/436 |
| 2013/0291485 A1 | | 11/2013 | McCorkle et al. |
| 2014/0048170 A1 | | 2/2014 | Evans |

OTHER PUBLICATIONS

Supplemental European Search Report and Communication for corresponding European Application No. EP12811892, dated Mar. 10, 2015, 11 pages.

European Search Report for corresponding EP Application No. EP12811892, date mailed Nov. 28, 2014, 6 pages.

\* cited by examiner

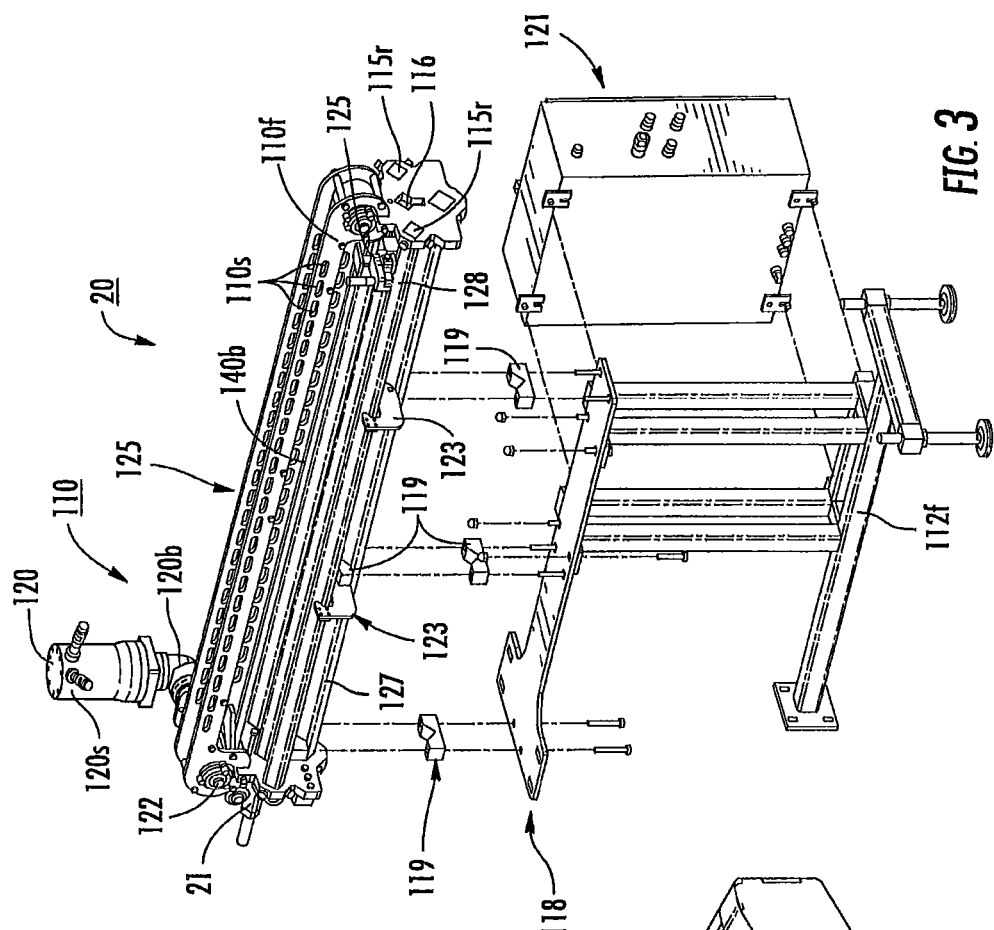
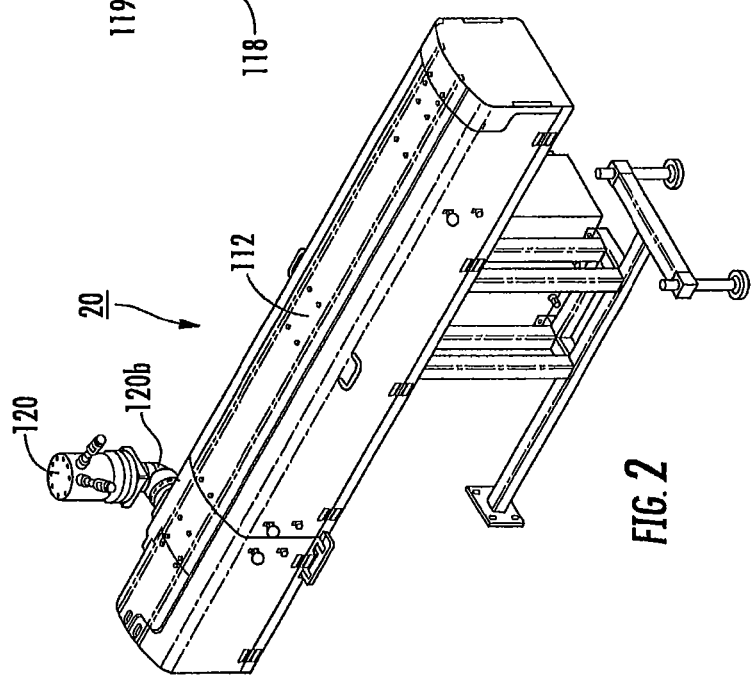
FIG. 3
FIG. 2

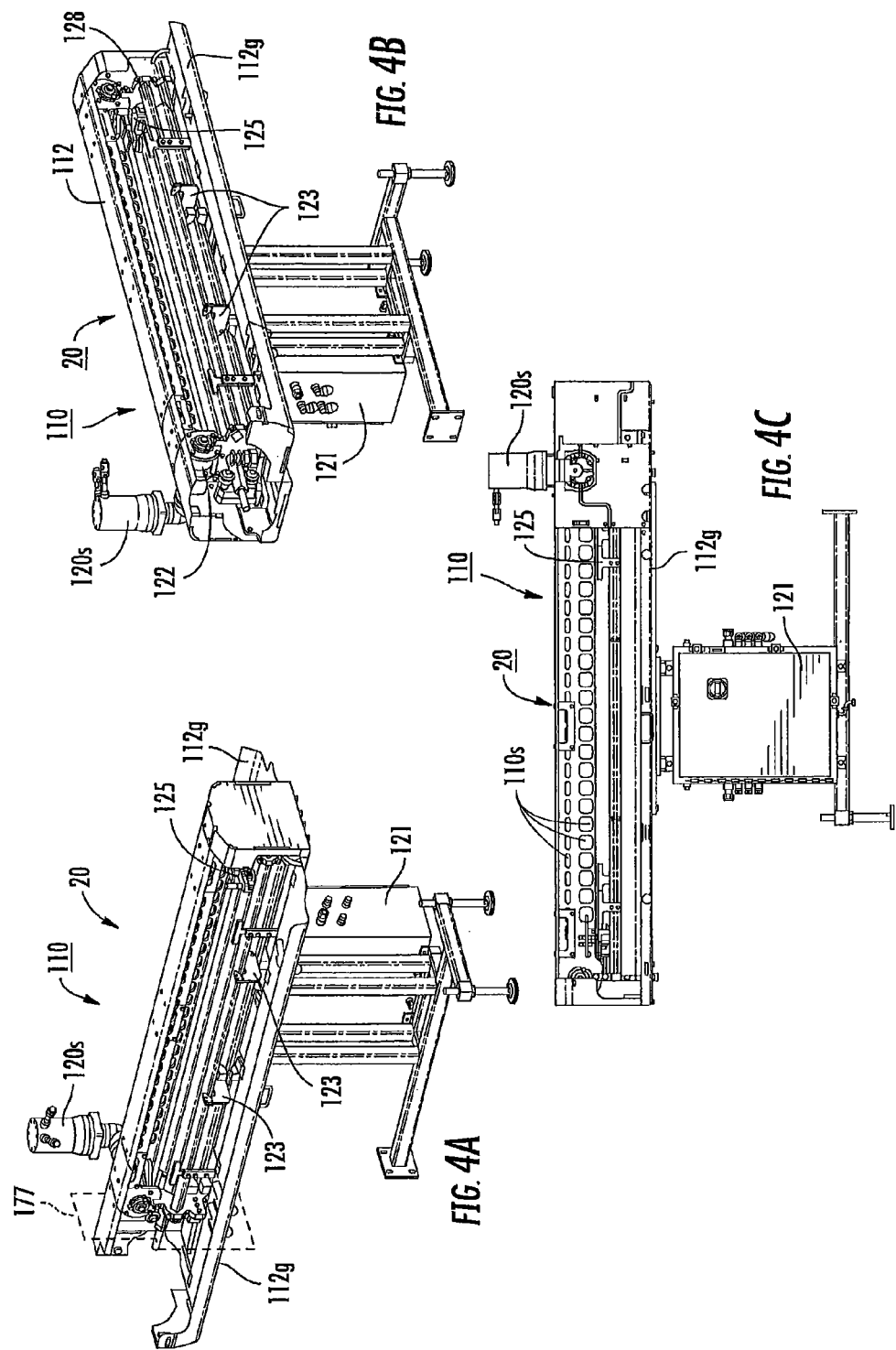

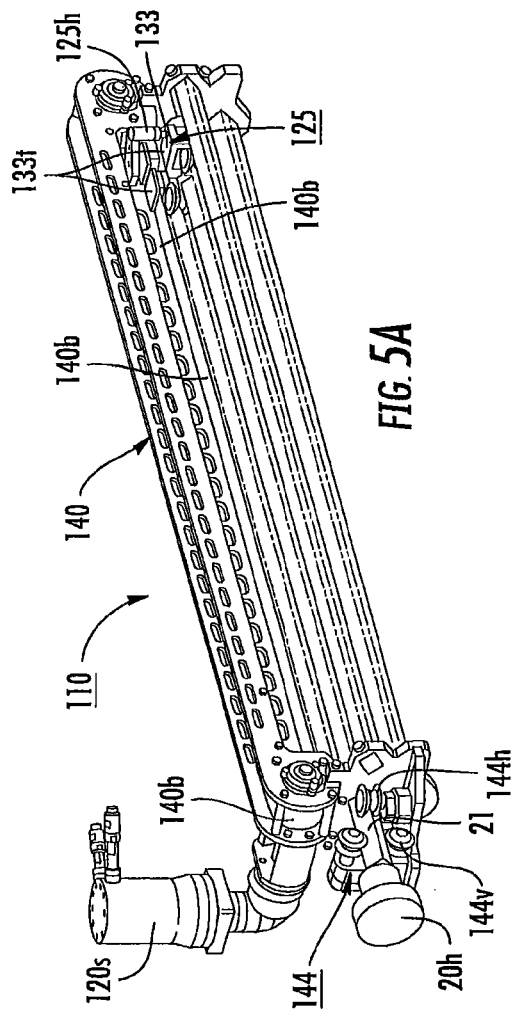
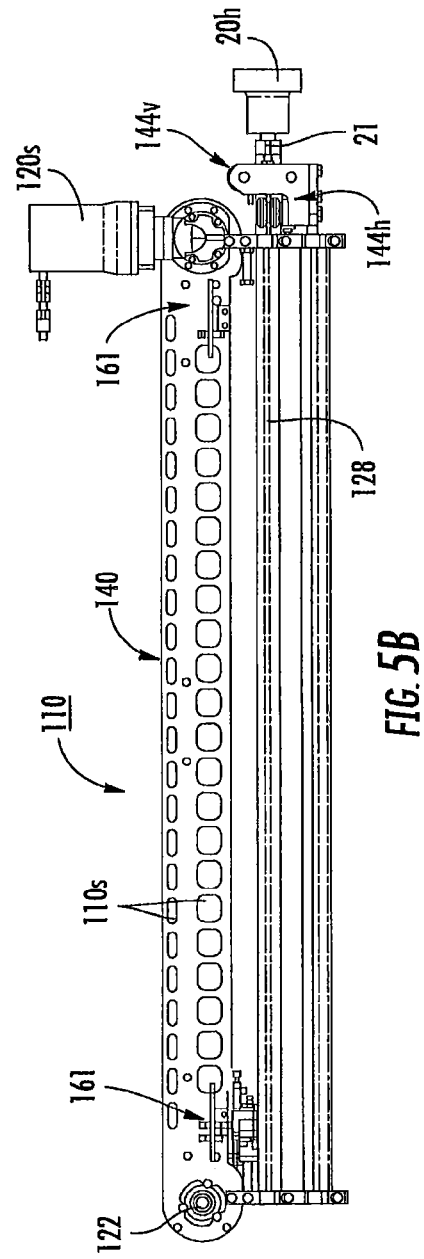
FIG. 5A
FIG. 5B

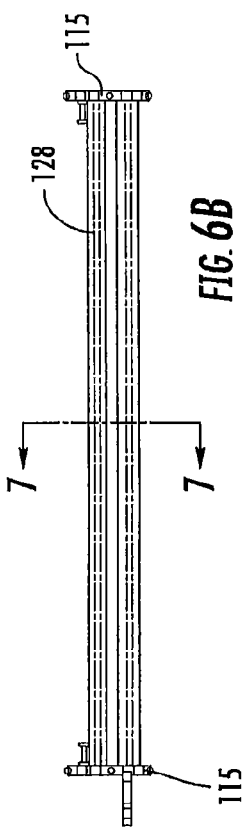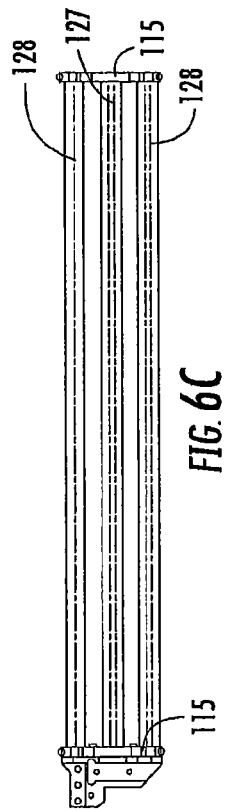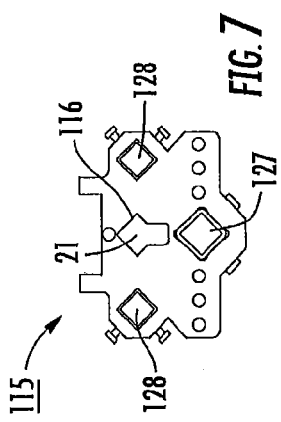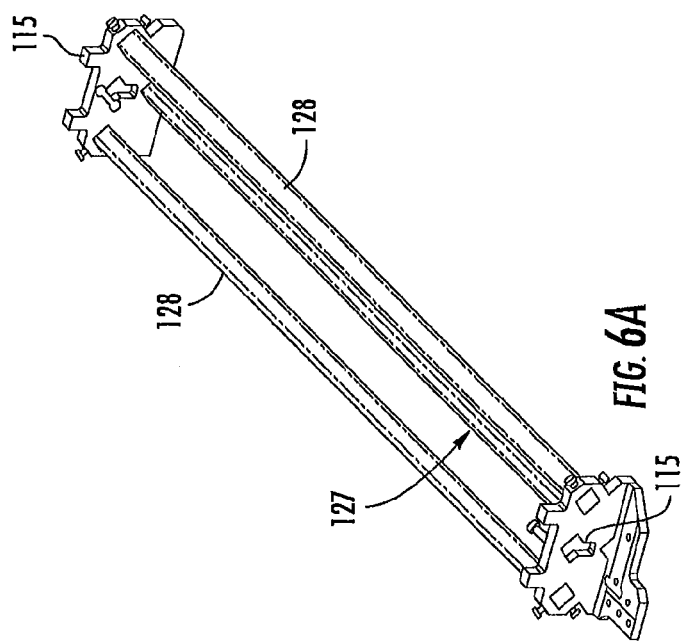

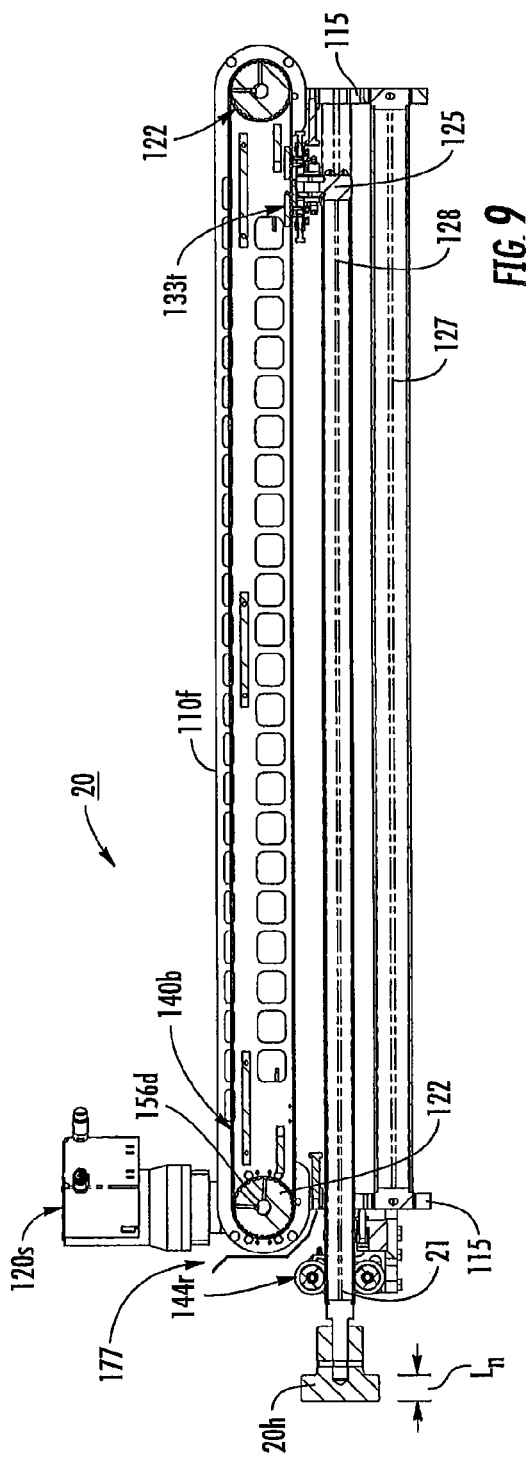
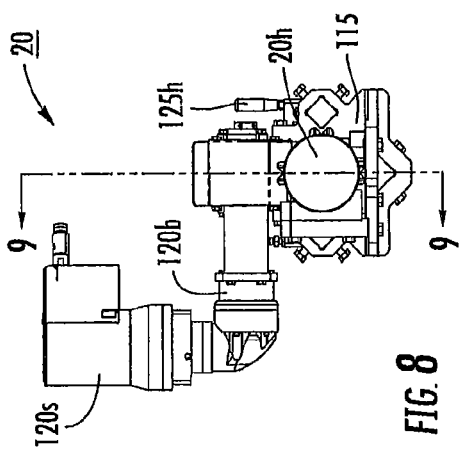
FIG. 9
FIG. 8

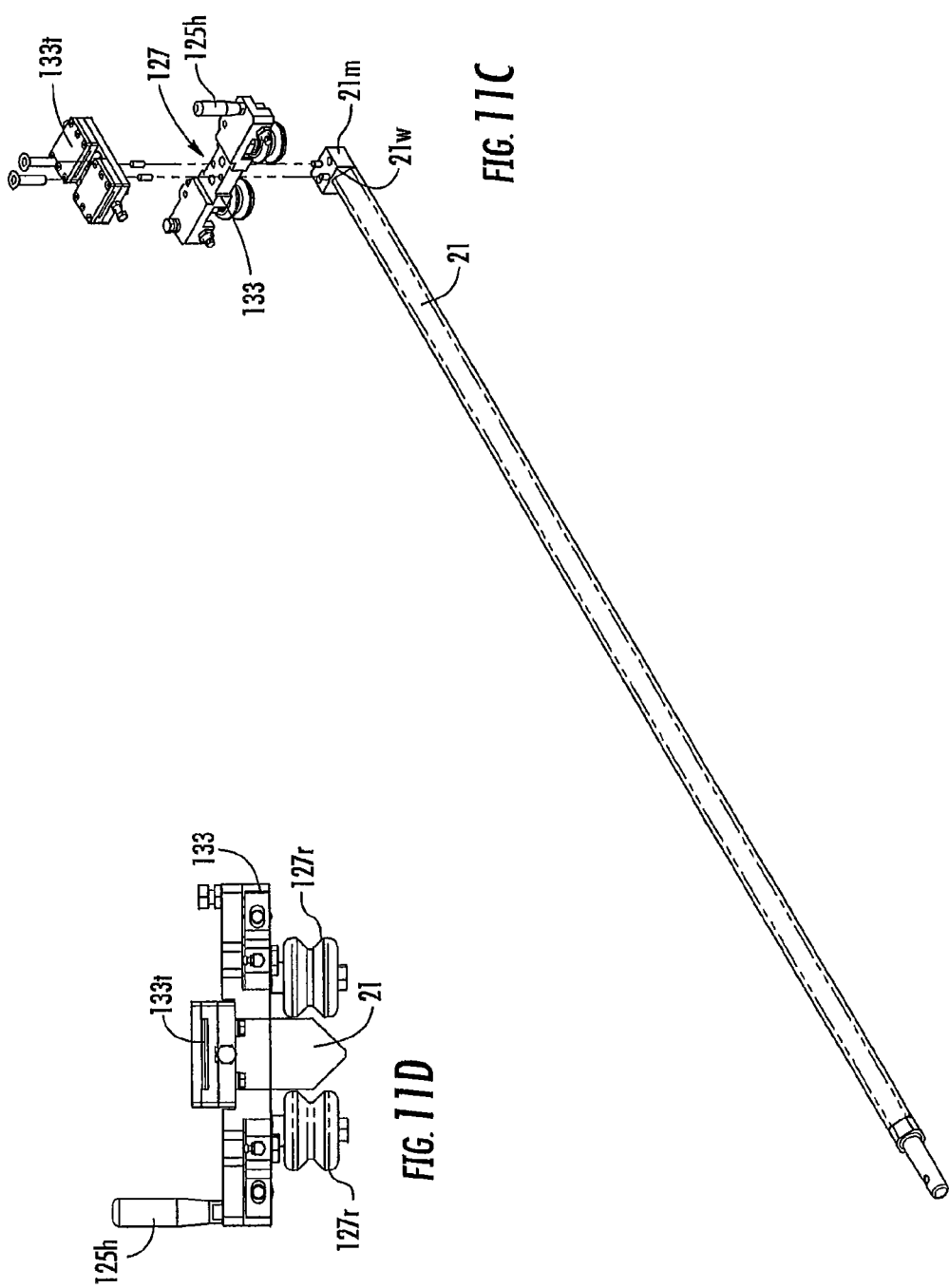

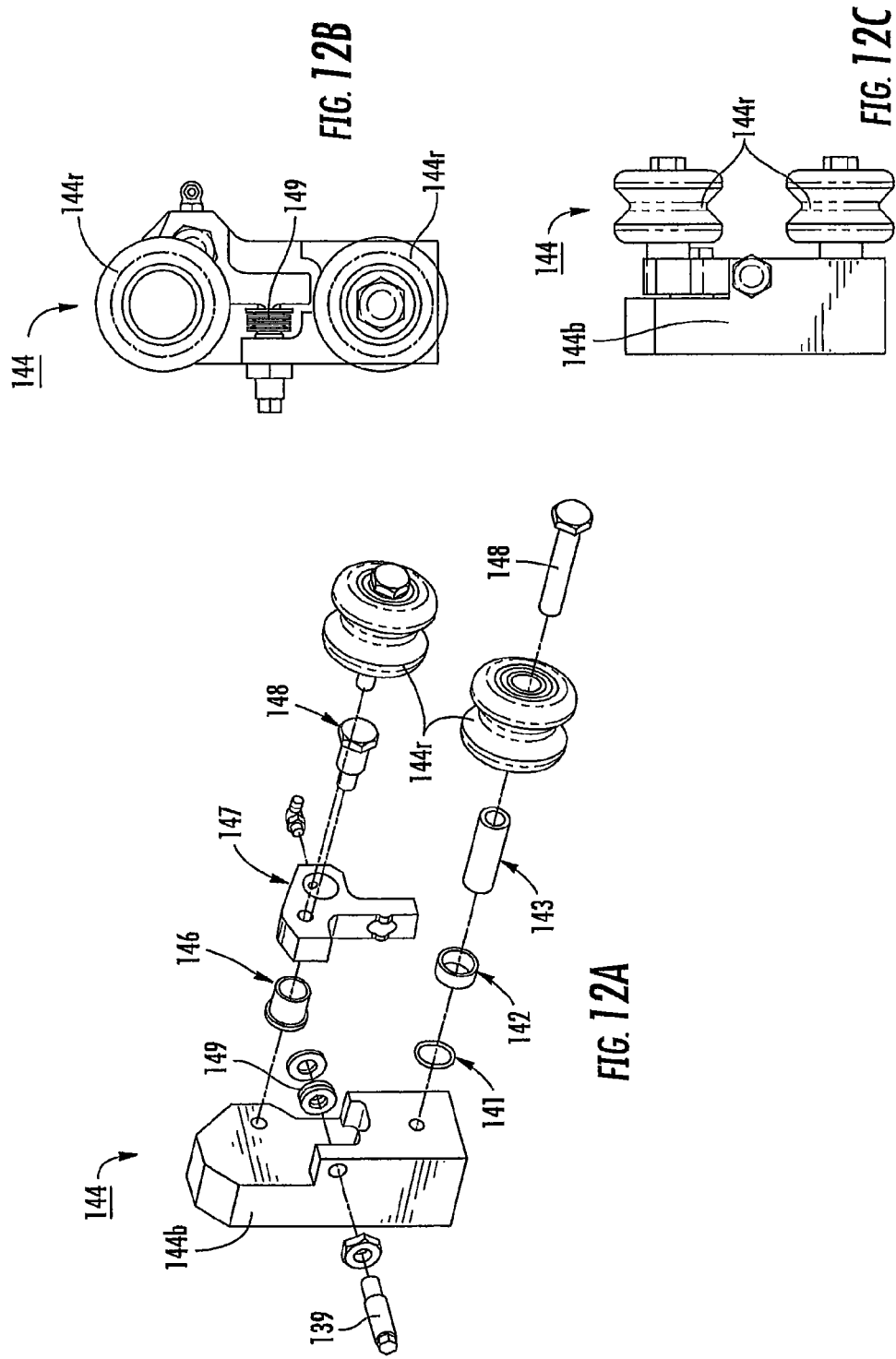

ELECTRIC MOTOR DRIVEN PUSHERS FOR AUTOMATED CLIPPING PACKAGING APPARATUS

RELATED APPLICATIONS

This application is a divisional application of U.S. patent application Ser. No. 13/546,323, filed Jul. 11, 2012, which claims the benefit of and priority of U.S. Provisional Application Ser. No. 61/507,208 filed Jul. 13, 2011, the contents of which are hereby incorporated by reference as if recited in full herein.

FIELD OF THE INVENTION

The present invention relates to apparatus that can package materials that enclose products therein, and may be particularly suitable for enclosing discrete pieces of whole muscle in clipped netting material.

BACKGROUND OF THE INVENTION

Certain types of commodity and/or industrial items can be packaged by placing the desired product(s) in a covering material, then applying a closure clip or clips to end portions of the covering material to secure the product(s) therein. For non-flowable piece goods, the piece goods can be held individually in a respective clipped package, or as a group of discrete or integrated (e.g., compressed) goods in a single package. The covering material can be any suitable material, typically a casing and/or netting material.

For example, the systems include a netting chute that holds a length of a netting sleeve over the exterior thereof. A first downstream end portion of the netting is typically gathered and clipped closed using a first clip. As the product exits the netting chute, it is covered with the netting. The leading and trailing edges of netting can be gathered and clipped, typically using single or double clippers. Clipping mechanisms or "clippers" are well known to those of skill in the art and include those available from Tipper Tie, Inc., of Apex, N.C., including product number Z4285. Examples of clip attachment apparatus and/or packaging apparatus are described in U.S. Pat. Nos. 3,389,533; 3,499,259; 4,683,700; and 5,161,347, and U.S. Patent Application Publication No. 2008/0000196, the contents of which are hereby incorporated by reference as if recited in full herein.

SUMMARY OF EMBODIMENTS OF THE INVENTION

Embodiments of the present invention provide electric motor driven automated pushers and related apparatus, sub-assemblies and/or other devices, systems, methods and computer program products for packaging target product.

Some embodiments of the invention are directed to methods, systems and devices that can automatically or semi-automatically package a product in a covering material, such as, for example, netting, and apply clips thereto.

Some embodiments are directed to packaging systems. The systems include a product chute and pusher assembly aligned with the product chute. The pusher assembly includes: (a) a pusher head; (b) a shaft attached to the pusher head; (c) a linear drive assembly in communication with the shaft; and (d) an electric motor with a gear box having an output rotor that is attached to the linear drive assembly to drive the linear drive assembly to reciprocate the pusher head between extended and retracted positions.

The electric motor is typically a servo motor, but can comprise other electric motor drive technologies and linear drive elements, e.g., stepper motors, an AC motor with VFD (variable frequency drive), an induction motor with a feedback encoder and a VFD drive, ball screws, chain drives and rack and pinion drives.

In some embodiments, a servo motor and gear box can cooperate with the pusher head to generate between about 100-400 lbf of force to push target product through the product chute.

The linear drive assembly can include first and second horizontally extending rails and a slide assembly attached to the shaft. The slide assembly can include first and second rollers that communicate with the rails. The slide assembly can move (e.g., roll) the shaft between the extended and retracted positions using the rails to guide the linear movement.

The linear drive assembly can include a belt held by a pulley with a drive shaft. The gear box can have a rotor that is attached to and turns the drive shaft to move the slide assembly along the rails.

The linear drive assembly can include first and second horizontally extending rails extending one on each side of the pusher shaft, and a slide assembly attached to a rear end portion of the pusher shaft. The slide assembly can include first and second rollers that are spring-loaded to contact the rails and guide the pusher head between the extended and retracted positions.

The system can also include a controller configured to define a speed profile that decelerates the pusher head to a slower speed at a forward end portion of a stroke cycle to thereby provide a soft stop. The speed profile may define a fast reset speed (faster than the speeds during the extension/forward stroke) to return the pusher head to the retracted position.

The controller may also provide a slow acceleration start, that then can increase using a faster acceleration (e.g., a soft start) at a start portion of the forward and/or rearward travel cycle.

The linear drive system can include laterally spaced apart front and back vertically oriented cooperating plates with rows of through-slots. The plates can hold a belt and drive and idler pulleys therebetween, with the gearbox rotor being indirectly attached to a drive shaft of the drive pulley.

The linear drive system can include: (a) first and second horizontally extending guide rails that reside on each side of the shaft; (b) a slide assembly with first and second rollers that contact a respective one of the first and second guide rails; and (c) a nose guide assembly comprising a pair of aligned vertically oriented rollers and a pair of aligned horizontally oriented rollers, the rollers spaced apart and residing about a perimeter of the shaft.

The belt can be a food grade material belt. The slide assembly can define a lower member of a belt tension clamp that holds adjacent short ends of the belt.

Still other embodiments are directed to a pusher assembly for packaging product in covering. The pusher assembly includes: (a) a pusher head; (b) an elongate shaft attached to the pusher head; and (c) a linear drive system in communication with the elongate shaft. The drive system can include a servo motor and gear box that powers the linear drive system to reciprocatingly move the pusher head between home and extended positions.

The pusher assembly can include: (i) first and second horizontally extending guide rails that reside one on each side of the shaft; (ii) a slide assembly with first and second rollers with a vertical axis of rotation that contact a respective one of the first and second guide rails; and (iii) a nose guide assembly comprising a pair of aligned vertically oriented rollers and a pair of aligned horizontally oriented rollers, the rollers can be spaced apart and reside about a perimeter of the shaft.

The pusher assembly can include a controller configured to define a speed profile that decelerates the pusher head to travel at a slower speed at a forward end portion of a stroke cycle to thereby provide a soft stop.

The pusher assembly controller may also provide a slow acceleration start, that then can increase using a faster acceleration (e.g., a soft start) at a start portion of the forward and/or rearward travel cycle.

The linear drive system can include front and back vertically oriented cooperating plates with rows of through-slots, the plates holding a food-grade material belt and drive and idler pulleys therebetween, with the gearbox being indirectly attached to a drive shaft of the drive pulley.

Yet other embodiments are directed to methods of pushing product through a chute. The methods include: (a) automatically sliding a pusher shaft with a pusher head along a pair of spaced apart horizontally extending guide rails; (b) advancing the pusher head into a product chute in response to the sliding step; and (c) discharging product from the product chute in response to the advancing step.

The methods can include electronically adjusting a speed of the pusher head to slow down to discharge the product into collagen film or paper using a soft stop to thereby inhibit tear or rupture of the film or paper.

The advancing step can be carried out by automatically driving the pusher shaft using a servo motor and gear box attached to a linear drive system with a belt.

The methods can include programmatically adjusting a speed profile associated with the servo motor.

Still other embodiments are directed to computer program products for operating an automated or semi-automated netting system. The computer program products include a non-transitory computer readable storage medium having computer readable program code embodied in the medium. The computer-readable program code includes computer readable program code that directs a product pusher assembly with a pusher head and servo motor to drive the pusher head through a stroke cycle with a speed profile that generates a deceleration before a forward end portion of the stroke.

It is noted that aspects of the invention described with respect to one embodiment, may be incorporated in a different embodiment although not specifically described relative thereto. That is, all embodiments and/or features of any embodiment can be combined in any way and/or combination. Applicant reserves the right to change any originally filed claim or file any new claim accordingly, including the right to be able to amend any originally filed claim to depend from and/or incorporate any feature of any other claim although not originally claimed in that manner. These and other objects and/or aspects of the present invention are explained in detail in the specification set forth below.

BRIEF DESCRIPTION OF THE DRAWINGS

FIG. 2 is a side perspective view of a servo drive pusher assembly according to embodiments of the present invention.

FIG. 3 is an exploded view of the pusher assembly shown in FIG. 2 without the external housing.

FIG. 4A is a side perspective view of the pusher assembly shown in FIG. 2 according to embodiments of the invention, with housing walls (guard doors) pivoted open according to embodiments of the present invention.

FIG. 4B is a front-end, side perspective view of the pusher assembly shown in FIG. 4A.

FIG. 4C is a side view of the pusher assembly shown in FIGS. 4A and 4B.

FIG. 5A is a front-end perspective side view of a pusher slide assembly of the servo drive pusher according to embodiments of the present invention.

FIG. 5B is a side view of the pusher slide assembly shown in FIG. 5A (with the forward end positioned at the right side of the view).

FIG. 6A is a top side perspective view of linear rails for the pusher slide assembly shown in FIG. 5A according to embodiments of the present invention.

FIG. 6B is a side view of the linear rails of FIG. 6A.

FIG. 6C is a top view of the linear rails shown in FIG. 6A.

FIG. 7 is a section view taken along line 7-7 of FIG. 6B.

FIG. 8 is a front end view of the pusher assembly (without the frame or housing) according to embodiments of the present invention.

FIG. 9 is a section view taken along lines 9-9 of FIG. 8 according to embodiments of the present invention.

FIG. 11C is a side top perspective exploded view of the slide assembly and pusher shaft according to embodiments of the present invention.

FIG. 11D is an end view of the assembly shown in FIG. 11C.

FIG. 12A is an exploded view of a nose roller assembly according to embodiments of the present invention.

FIG. 12B is an assembled side (or top) view of the nose roller assembly shown in FIG. 12A.

FIG. 12C is an assembled top (or side) view of the nose roller assembly shown in FIG. 12A.

DESCRIPTION OF EMBODIMENTS OF THE INVENTION

Figure 1:
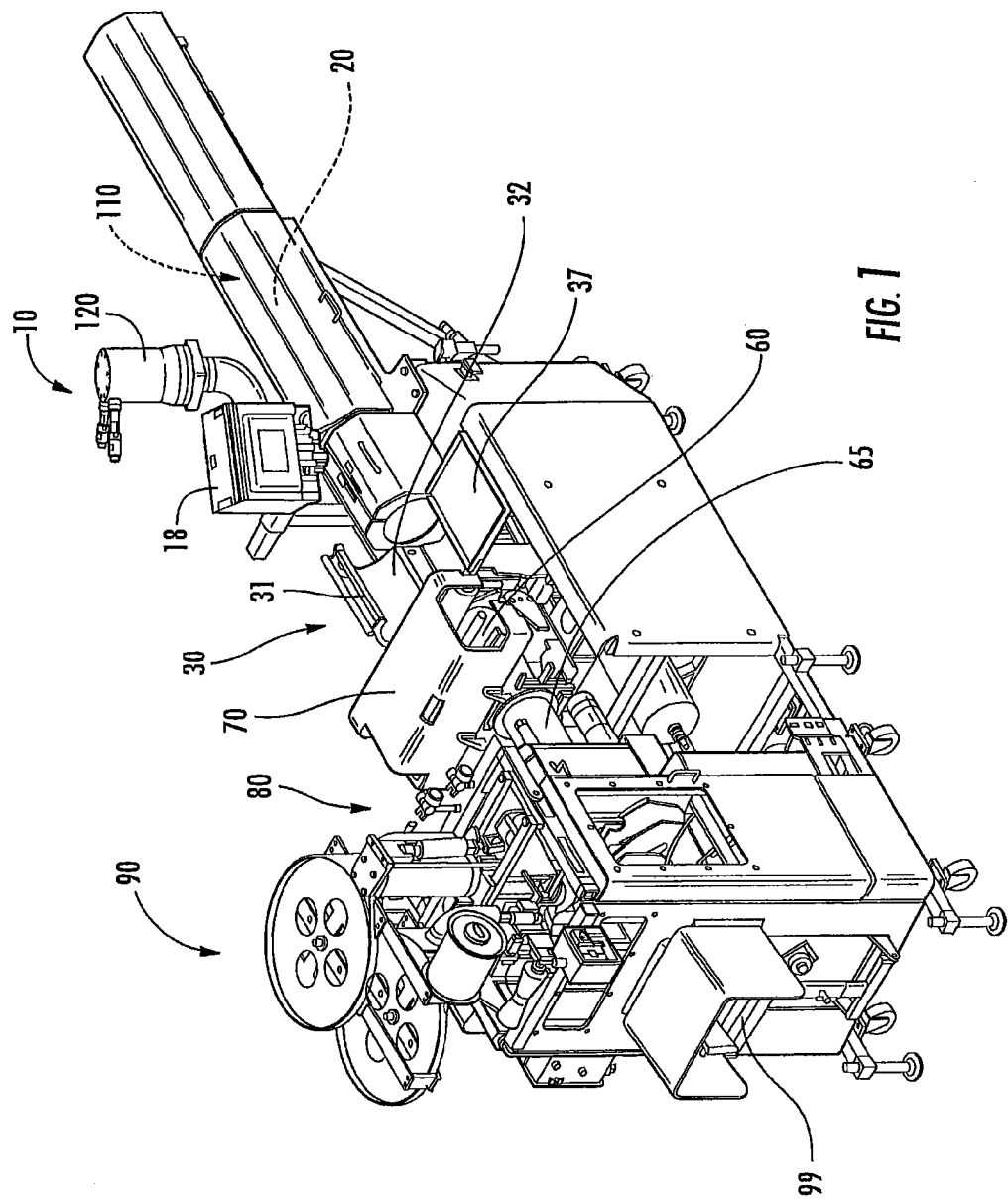
FIG. 1 is a side perspective, discharge end view of an apparatus/system used to automatically advance product through a product chute and then automatically apply at least one clip according to embodiments of the present invention.

The present invention will now be described more fully hereinafter with reference to the accompanying figures, in which embodiments of the invention are shown. This invention may, however, be embodied in many different forms and should not be construed as limited to the embodiments set forth herein. Like numbers refer to like elements throughout. In the figures, certain layers, components or features may be exaggerated for clarity, and broken lines illustrate optional features or operations, unless specified otherwise. In addition, the sequence of operations (or steps) is not limited to the order presented in the claims or figures unless specifically indicated otherwise.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

It will be understood that when an element is referred to as being "on", "attached" to, "connected" to, "coupled" with, "contacting", etc., another element, it can be directly on, attached to, connected to, coupled with or contacting the other element or intervening elements may also be present. In contrast, when an element is referred to as being, for example, "directly on", "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly.

The term "about" means that the value can vary by +/−20% from the stated number.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

In the description of embodiments of the present invention that follows, certain terms are employed to refer to the positional relationship of certain structures relative to other structures. As used herein, the terms "front," "forward" and derivatives thereof refer to the general or primary direction that a target product travels for enclosure and/or clipping; this term is intended to be synonymous with the term "downstream," which is often used in manufacturing or material flow environments to indicate that certain material traveling or being acted upon is farther along in that process than other material. Conversely, the terms "rearward," "upstream" and derivatives thereof refer to the directions opposite, respectively, the forward and downstream directions.

The term "frame" means a generally skeletal structure used to support one or more assemblies, modules and/or components. The frame may be one integral structure or a plurality of individual structures mountable to each other or a common floor structure or the like. The term "modular" means that a subassembly is designed with standardized dimensions, mounting features and/or configurations for interchangeable use with replacement modules of the same or similar type and/or other selected different modules. The term "module" can refer to an assembly or subassembly that includes certain components, features or devices that carry out specified functions. However, the term "module" when used with respect to a controller or computer operation, refers to a circuit that includes software (e.g., computer program code) only or software and hardware components.

The term "breech" refers to the (side) entry of a product into the loading chute via a door/ceiling according to some particular embodiments. The term "loading chute" may also be described as a "breech chute" in some embodiments.

The term "electric motor" refers to DC or AC motors, including servo motors, that can be used to drive a pusher head as will be discussed further below. The electric motor-drive systems are in contrast to conventional pneumatic actuation drives. The electric motor based drive system can comprise other motor drive technologies and linear drive elements, e.g., stepper motors, an AC motor with VFD (variable frequency drive), an induction motor with a feedback encoder and a VFD drive, ball screws, chain drives and rack and pinion drives and the like. In a preferred embodiment, the electric motor is a servo motor. The servo motor may operate using motor feedback in a control system. This feedback can be used to detect unwanted motion, adjust speed and/or to monitor the accuracy of the commanded motion. The feedback can be provided by an encoder or sensor.

The term "servo drive" refers to a drive system that controls the servo motor. Generally stated, the servo drive transmits electric current to the servo motor in order to produce motion proportional to the command signal. A command signal can represent a desired velocity, acceleration or deceleration, but can also represent a desired torque or position. The servo motor can have one or more sensors that report the motor's actual status back to the servo drive. The servo drive can adjust the voltage frequency and/or pulse width to the motor so as to correct for deviation or drift and the like.

Embodiments of the present invention are particularly suitable for devices that cooperate with clippers to apply closure clips to objects held in a covering material. The covering material may be natural or synthetic and may be a casing material that can be sealed about a product or may be netting. The casing can be any suitable casing (edible or inedible, natural or synthetic) such as, but not limited to, collagen, cellulose, plastic, elastomeric or polymeric casing. In certain embodiments, the casing comprises netting. The term "netting" refers to any open mesh material in any form including, for example, knotted, braided, extruded, stamped, knitted, woven or otherwise. Typically, the netting is configured so as to be stretchable in both axial and lateral directions.

Netting or other covering material may be used to package discrete meat products such as loaves of meat, boned ham, spiral sliced ham, deboned ham, turkey, turkey loaves held in molds, or other meat or items directly or with the items held in subcontainers and/or wraps such as molds, trays, boxes, bags, absorbent or protective sheets, sealant, cans and the like. Other embodiments of the present invention may be directed to package other types of food such as cheese, bread, fruit, vegetables, and the like, as well as non-food items. Examples of non-food items that may be packaged using embodiments of the present invention include living items such as flora, trees, dirt, plants, seeds, bulbs and the like, as well as inanimate objects. Additional examples of products include discrete, semi-solid or solid objects such as firewood, pet food (typically held in a container if the wet type), recreational objects (such as balls), or other solid or semi-solid objects. The product may be packaged for any suitable industry including horticulture, aquaculture, agriculture, or other food industry, environmental, chemical, explosive, or other application. Netting may be particularly useful to package whole muscle (uncooked meat), ham or turkeys, manufactured hardware such as automotive parts, firewood, explosives, molded products, and other industrial, consumable, and/or commodity item(s).

Generally stated, some particular embodiments of the present invention are directed at automating the packaging of discrete pieces of whole muscle meat product by automatically pushing pieces of the whole muscle (concurrently) through a product chute and wrapping or enveloping the objects at the other end of the chute in netting (e.g., "open net", so that the whole muscle therein is exposed to environmental conditions), then automatically or semi-automatically clipping the covering material with a closure clip or other attachment means to close the covering and hold the object or objects inside of the covering material. The packaging systems can optionally include a collagen food film forming module that forms a tubular protein layer over compressed whole muscle (e.g., COFFI material sold by Naturin) or other thin covering that is then covered by the netting.

The netted whole muscle may be in a single package or may be packaged in a series of linked packages (such as similar to "chubs"). The whole muscle may be processed so that protein migrates to or resides proximate an outer surface so that adjacent pieces of whole muscle may combine, attach, and/or bind when held in the netting during subsequent processing, without requiring any compression of the whole muscle during packaging in the netting.

In some embodiments, whole muscle pieces can be compressed and packaged together, with or without a collagen film outer layer inside the netting. Where linked, the space between the actual netted product can have sufficient length to allow exposure (non-contact between adjacent netted product links) of adjacent ends of the netted whole muscle to processing conditions (such as smoke from a smoker).

FIG. 1 illustrates an exemplary automatic clipping packaging apparatus 10 according to embodiments of the present invention. As shown, the apparatus 10 may include one or more controllers 18, which may be incorporated into or communicate with an HMI (Human Machine Interface), an automated product pusher assembly 20, an optional loading chute 30, a product chute 60, a covering (typically netting) chute 65, an optional protein or collagen film forming module 70, a braking module or assembly 80 (which may also function as a slack-fill assembly and/or derucker), a clipper module or assembly 90, and an optional discharge roller table 99.

It is noted that although illustrated in FIG. 1 with an exemplary loading chute 30 and product chute 60, the pusher assembly 20 and linear drive system 110 can also be used for other packaging apparatus, including, for example, to replace the pneumatic pushers described in U.S. Pat. Nos. 7,313,896 and 7,392,635, the contents of which are hereby incorporated by reference as if recited in full herein.

As shown in FIGS. 2 and 3, the pusher assembly 20 can include a linear drive system 110 with an electric motor 120, preferably a servo motor 120s. The linear drive system 110 drives a shaft 21 attached to a pusher head 20h (FIGS. 5A, 5B). FIG. 2 illustrates the pusher assembly 20 enclosed in a housing 112. FIG. 3 illustrates the drive system 110 without the housing 112 and without the pusher head 20h for ease of discussion. In operation, the shaft 21 has a length and stroke cycle that allows it to reciprocate (move) between extended and retracted positions. In the retracted position, the pusher head 20h at the forward end portion of the shaft 21 is in a "home" position upstream of the product chute 60, and where used, upstream of the loading chute 30. In the extended position, the pusher head 20h is extended a distance forward to allow the pusher head 20h to enter (and typically exit an egress end of) the product chute 60. The pusher head 20h can be releasably locked to the end of the shaft 21, such as via a detachable locking pin which allows a user to remove the pin to slide the head 20h off the shaft 21.

Figure 10:
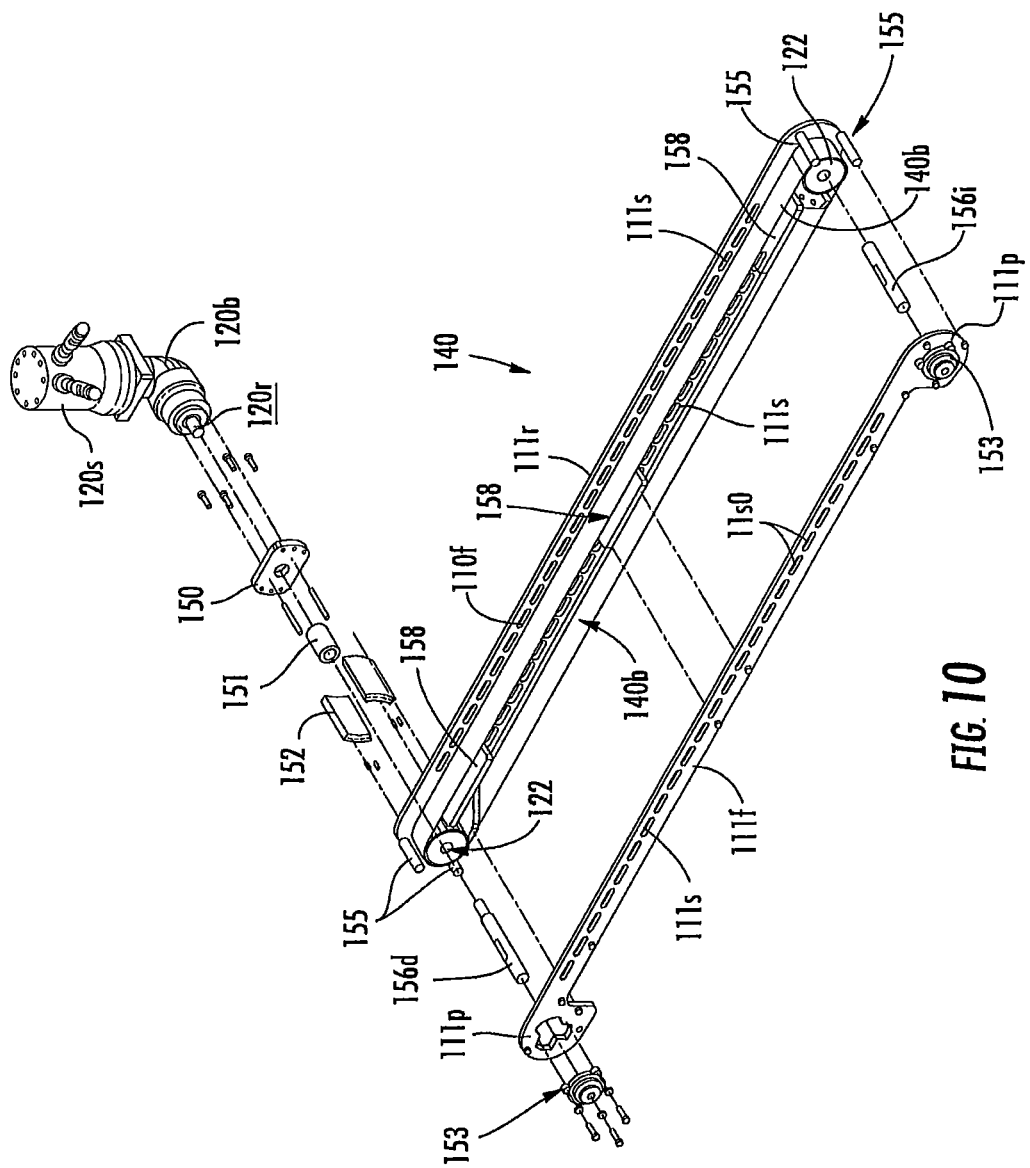
FIG. 10 is an exploded view of an exemplary drive system for the pusher assembly shown in FIG. 2 according to embodiments of the present invention.

In some embodiments, the servo motor 120s and drive system 110 are configured to allow the pusher head 20h to output between about 100-400 lbf to force product through the product chute 60, typically about 250 lbf to match conventional pneumatic systems. However, the pusher assembly 20 can apply other forces. In the embodiment shown, the servo motor 120s is attached to a right angle gear box 120b. However, it is contemplated that the motor 120 can be used with a linear gear box to drive the linear drive system 110. In addition, FIG. 3 illustrates that the drive system 110 includes a servo control box 121 attached to a support frame 1121. However, the servo controls may be provided in other locations and/or integrated into other modules of the device (local or remote) or in other boxes or panels and the like. FIG. 3 also illustrates the motor 120 positioned at a forward, top portion of the pusher assembly 20 so that the gear box engages a drive shaft 156d associated with a drive pulley wheel 122 (FIG. 10). However, the motor 120 and/or gear box can be positioned at different locations, particularly where other drive mechanisms are used.

In some embodiments, the motor 120, typically a servo motor 120s, can decrease the cycle time to allow for a faster reset cycle time relative to conventional pneumatic operated devices. The pusher assembly 20 with the motor 120, e.g., servo motor 120s, and the slide action rod or shaft 21 can also have a quieter operation over conventional pneumatic pusher systems while providing speed change capability at different distances of the stroke cycle. The pusher assembly 20 can accommodate a number of different product chute configurations and lengths. Indeed, it is contemplated that use of the electric motor-driven linear pusher assemblies will allow for wider, deeper loading chutes (breech chutes) as compared to conventional packaging systems. The drive, motor and gear ratios can be selected to operate with the different loading (force/speed) requirements.

The servo motor 120s can be any suitable servo motor. For example, for food uses, a food grade motor such as MPS-B4540E-MJ52D from Allen Bradley with a Kinetix® 300 Ethernet/IP Indexing Servo Drive, 3 phase, 6A, 480V (no filter) using about 3 kW of power, Part No. 2097-V34PR6, from Allen Bradley (Rockwell Automation, Milwaukee, Wis.) with a suitable gear box, such as an "AER" series from Apex Dynamics USA, Holbrook, N.Y. As will be recognized by those of skill in the art, other servo motors and gear boxes providing satisfactory outputs and control may also be used.

To help select suitable components, Motion Analyzer software can be used. For example, Rockwell Automation (Allen Bradley) provides a motion-application sizing tool that can be used for analysis, optimization, selection and validation of Kinetix® motion control systems. See, the URL address of ab.rockwellautomation.com/Motion-Control/Motion-Analyzer-Software.

In the embodiment shown in FIGS. 2 and 3, the linear drive system 110 drives a pusher slide assembly 125 that includes a pair of laterally spaced apart linear rails 128. The linear drive system 110 can be a belt drive system 140 as shown in FIGS. 5A, 5B and 10. The belt 140b can be an FDA food grade material suitable for food or cosmetic purposes and able to withstand approved food environment cleaning (wash down) protocols. Exemplary food-grade belts and belt assemblies (belts with pulleys, bearings and the like) are available from Brecoflex Co., Eatontown, N.J. The belt 140b may be a AT10 Profile, polyurethane belt with a stainless steel tension member. The belt 140b may be between about 100-200 inches long, typically between about 150-170 inches and may be about 1-3 inches wide, typically about 2 inches. However, it is contemplated that other belt sizes may be used.

In other embodiments, different linear drive systems may be used, including, for example, an open ball-screw, a geared beltless system, a chain drive, a roller drive, rack and pinion and the like (not shown).

Referring to FIG. 3 and FIGS. 4A-4C, the linear drive system 110 can include an open support frame 110f with open slots 110s allowing for ease of wash down (spray side to side) when the housing guard doors 112g are pivoted down. As shown in FIG. 10, the support frame 110f can include a front plate 111f and a rear plate 111r, which each include slots 111s or apertures for ease of wash down.

Still referring to FIGS. 3 and 4A-4C, the pusher assembly 20 can include forward and rearward mounting plates 115, each with an aligned slide aperture 116 (FIG. 7) for allowing the pusher head shaft 21 to slide back and forth therethrough. FIG. 7 also illustrates the mounting block 115. The plates 115 can also include rail support apertures 115r. Instead of rail support apertures 115r, brackets or other support configurations may be used.

FIG. 3 also illustrates that the pusher assembly 20 may include a support plate 118 that attaches to the support frame 1121 and the forward mounting block 115. The support plate 118 can support mounting blocks 119 that attach to rail supports 123.

FIGS. 5A and 5B illustrate an exemplary pusher slide assembly 125 that advances and retracts the shaft attached to the pusher head 20h. Although primarily configured for automatic operation, the slide assembly 125 can include a user handle 125h that allows a user to manually move the pusher shaft and attached head 20h. The term "slide assembly" refers to a mechanism that moves the shaft along a defined travel path using a sliding, rolling and/or other movement.

Figure 11A:
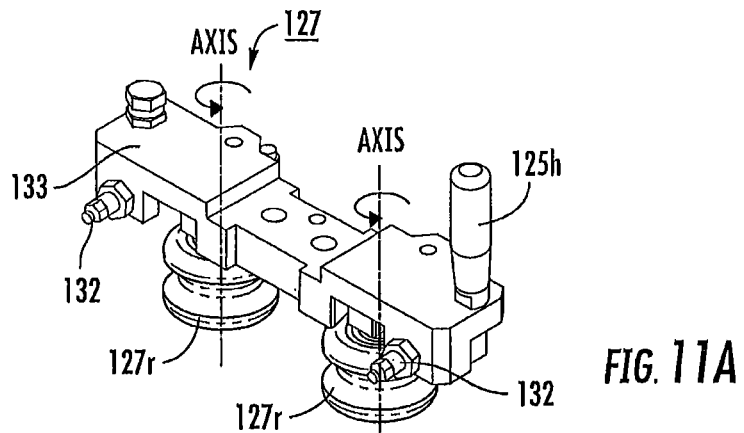
FIG. 11A is a top, side perspective view of a slide roller assembly according to embodiments of the present invention.
Figure 11B:
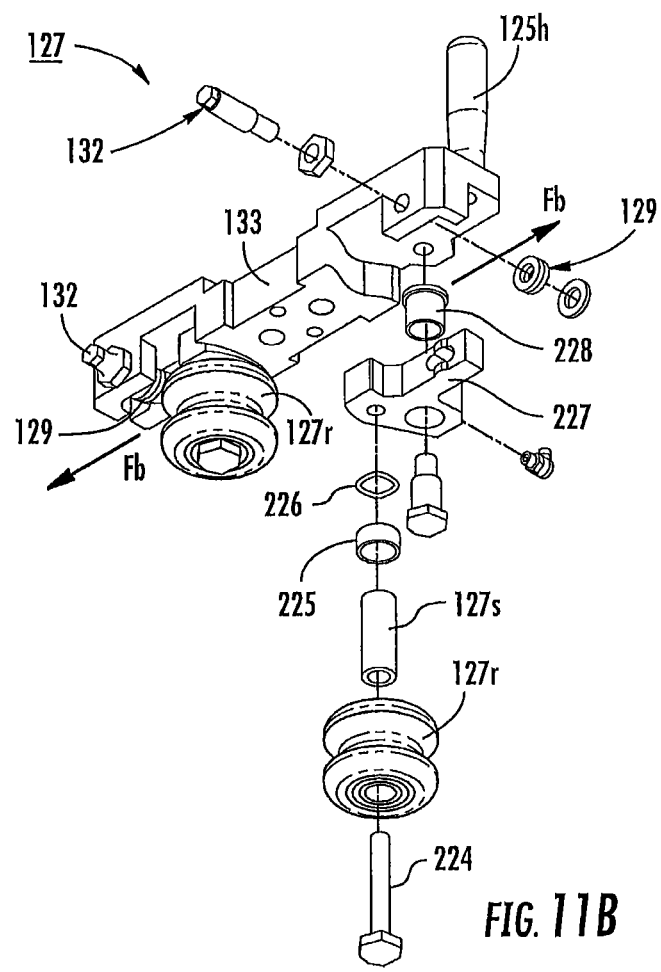
FIG. 11B is an exploded view of the slide roller assembly shown in FIG. 11A.

As shown in FIGS. 11A and 11B, the pusher slide assembly 125 can include a slide roller assembly 127 (FIGS. 11A, 11B) with a pair of laterally spaced apart "floating" or self-adjusting rollers 127r that are oriented to rotate about a vertical axis and travel longitudinally along the rails 128, with one roller 127r positioned adjacent a corresponding one rail 128. The rollers 127r can be "V" shaped rollers or rollers that have a medial recess relative to outer portions thereof. The "V" can have about a 90 degree angle. The roller width can be about 1.5 inches and diameter of about 2.5 inches. An exemplary roller is available as P. N. 2.50"×1.50" All Poly V-Groove 75D Black from Sunray, Inc., Rutherfordton, N.C., However, other roller sizes and dimensions may be used. The rollers can comprise a food grade polymeric material such as polyurethane and have a hardness of between about 60-90 durometer, typically about 75 durometer.

The rollers 127r can be pre-loaded with a bias force Fb to force the rollers 127r outward to snugly abut the respective rail 128. The bias force can be provided using a resilient elastic member or members 129 such as a plug of elastic flexible material, a spring, including a leaf spring, a coil spring, dome or disc (conical spring) washers, clover dome washers, wavy washers and the like and/or combinations of these components. In some embodiments, a stack of 3-10 Belleville dome washers can be used (stacked with adjacent ones having reversed orientations), more typically about 6. As shown, a mount block 133 can hold the rollers 127r and resilient member(s) 129. As also shown, a spring tension screw 132 can be used to adjust the bias force Fb. The spring tension screw 132 and resilient member 129 can allow side to side movement of the roller(s 127r). Typically, the preload setting is between about 0.000 inches to about 0.072 inches providing between about 0 lbs to about 112 lbs at optimal and/or maximum spring deflection. However, with more deflection, this load can be increased up to about 175 lbs with the design shown (six alternately oriented stacked Belleville washers). Other designs and/or numbers of stacked washers can be used to provide a desired load and/or adjustment. In some embodiments, about a ½ turn of the spring tension screw 132 generates about 53 lbs of bias force. Other configurations, loads and bias forces, and adjustment capacity may be used.

The slide roller assembly 127 can also include respective coupler rods 224, roller shafts 127s, bearing spacers 225, wave disc springs 226, adjusting plates 227 and bushings 228. However, other mounting configurations and assemblies can be used.

FIGS. 5A, 11A-11F illustrate that the mount block 133 can define a lower portion (clamp plate) of a compact belt tension block 133t that holds adjacent ends of a belt 140b and allows for tension adjustment of the belt 140b (and release and attachment).

Figure 11E:
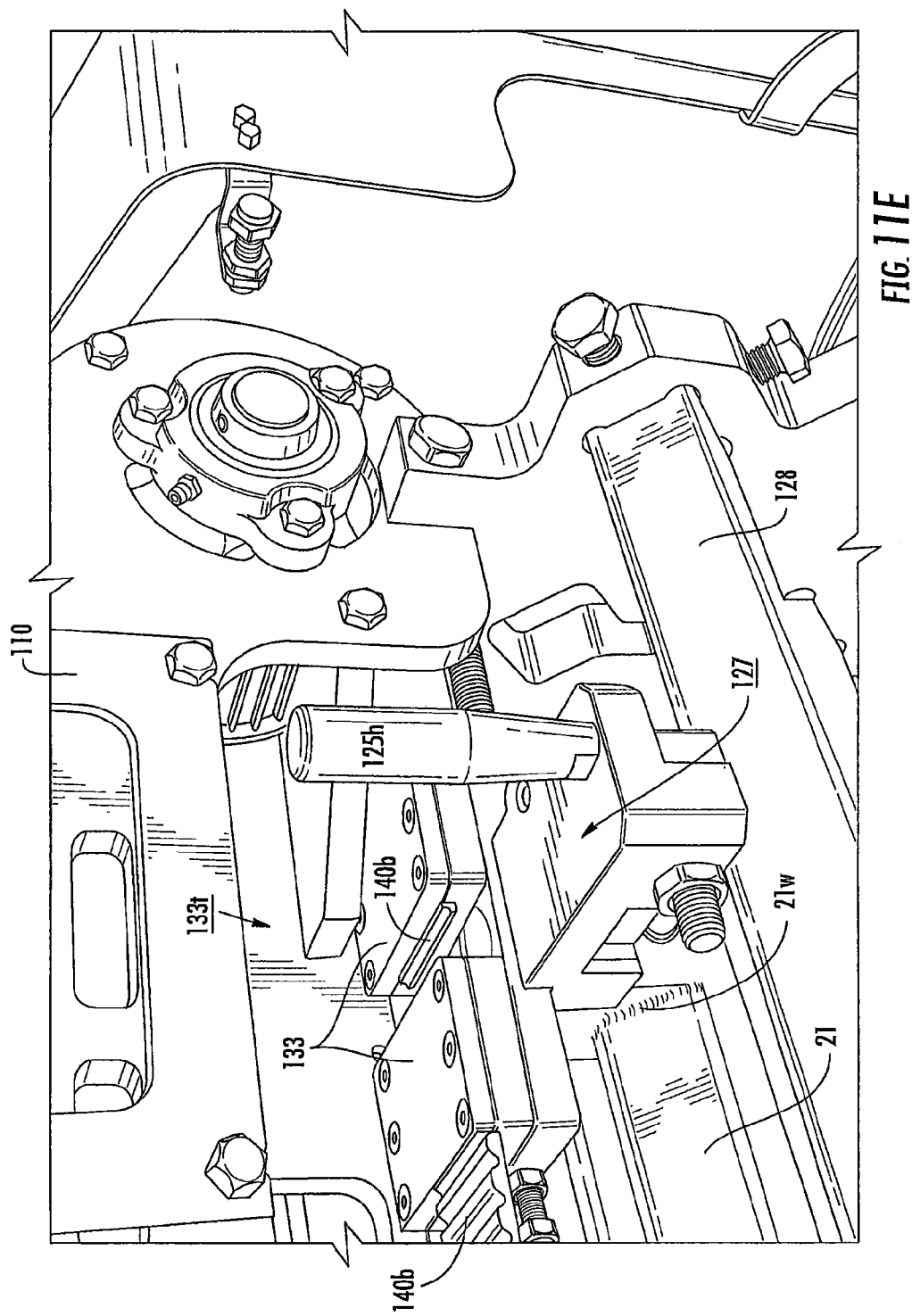
FIG. 11E is an enlarged side perspective view of the slide assembly and shaft according to embodiments of the present invention.

FIGS. 11C-11E illustrate that the shaft 21 can be affixed to a lower medial portion of the mount block 133. As shown in FIGS. 11C and 11D, the shaft 21 is welded 21w to a mounting bracket that is dowel pinned and bolted to the mount block 133 of the slide assembly 127. However, other attachment configurations may be used to attach the shaft to the slide assembly 127, including bolts, pins, and other bracket configurations.

Figure 11F:
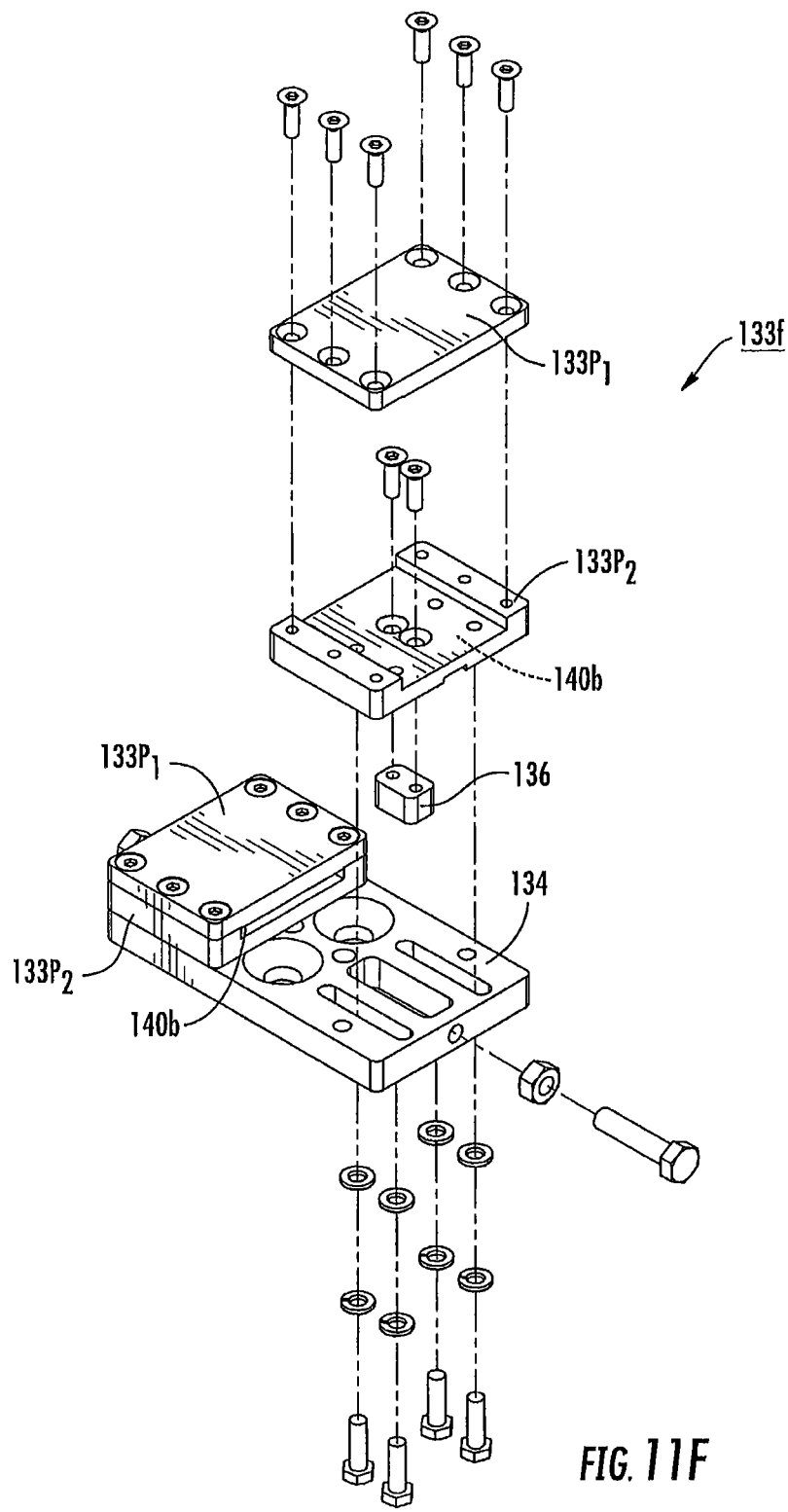
FIG. 11F is an exploded view of a belt tension assembly according to embodiments of the present invention.

FIG. 11F is an exploded view of an exemplary belt tension assembly 133t that mounts to the slide assembly 127. The belt tension assembly 133t includes a pair of top clamp plates $133p_1$ and a pair of bottom clamp plates $133p_2$ that trap a belt end 140b therebetween. The pairs of clamp plates $133p_1$, $133p_2$ are held by a support plate 134 that resides in a channel defined by mount plate 133 of the slide assembly 127. The assembly can use stop blocks 136, one that reside between each lower plate $133p_2$ and the stop plate 134.

FIGS. 5A, 5B and 12A-12C illustrate that the linear drive system 110 can also include a nose roller assembly 144. The assembly 144 shown in FIGS. 12A-12C can be used for both the vertically and horizontally mounted rollers 144r. The rollers 144r can optionally have the same size and shape as the rollers 127 discussed above for the slide assembly 125. FIGS. 5A and 5B illustrate that one nose roller assembly can be oriented vertically (one stacked above and aligned with the other with a horizontal axis of rotation) 144v and the other can be oriented horizontally (laterally spaced apart and aligned with a vertical axis of rotation) 144h. While two of the same assembly 144 can be used as shown (oriented differently for operation), different configurations/assemblies can also be used to provide the desired roller alignment of the front end of the linear drive assembly 110. In the embodiment shown, the nose roller assemblies 144v, 144h are affixed and remain in position (the rollers rotate, but the assemblies do not move with sliding movement of the shaft 21). The nose roller assemblies 144v, 144h can be configured so that one of the rollers 144r in the vertical orientation and one in the horizontal orientation have a fixed geometry (e.g., the bottom and back rollers) to maintain a desired alignment when the shaft 21 of the pusher head 20h slides back and forth. In the embodiment shown, the bottom and back rollers are the fixed rollers providing a positive location along the entire slide stroke length, with the other rollers providing a spring force bias to push the shaft 21 against the fixed roller elements thus maintaining roller contact and alignment at all times allowing for suitable operation irrespective of conventional manufacturing tolerances of the linear rail elements (thus not requiring precision machining of the rails).

Referring to FIGS. 12A-12C, one roller 144r can be attached to a nose roller mount block 144b using a bushing 146, an adjusting plate 147 and an axle 148. A spring tension screw 139 can also be used with resilient elastic members 149 (such as stacked Belleville washers as discussed above for members 139). The other roller 144r can be mounted using a different mounting configuration. As shown, the roller 144r is attached to the nose roller mount block 144b using a wave disc spring 141, a bearing spacer 142, a roller shaft 143 and axle 148.

FIGS. 5A and 5B also show that the linear drive system 110 can include a plurality of proximity switches 161 that may be set to be about 1-3 inches from a desired home position or defined end of a set stroke (for retract and advance over travel cut off).

FIGS. 6A-6C illustrate that the pusher assembly 20 can include rails 128 that are substantially square in section. However, other embodiments can use round, hexagonal, oval or other cross-section shaped rails 128. The lower support rail or shaft 127 can also be square and larger than the rails 128. The rail 127 can have a different cross-sectional shape as well, including round and oval and other polygonal shapes including, for example, rectangular, hexagonal, and octagonal. The rail 127 and rails 128 can be bolted to the plates 115 to allow proper alignment without distortion that welding may introduce. However, other attachment techniques can be used including welding, brazing, adhesive attachments, ultrasonic bonding and the like, some of which may also need post-machining to provide rail accuracy. In some embodiments, the rails 128 are drawn, stainless steel, hardened tubes that do not require machining. The free-floating rollers 127r of the slide assembly 125 can be configured so as not to require precision railing thereby providing for a more economic system.

Referring again to FIG. 10, the belt drive assembly 140 can include a gear box mount 150, a shaft coupler 151, a motor mount spacer 152, pulleys 122, flange bearings 153 (adjacent pulley flanges 111p), front and back plates 111f, 111b, belt 140b, plate spacers 158, alignment members 155, a drive shaft 156d and an idle shaft 156i. The gear box 120b includes an output rotor or shaft 120r that connects to the drive shaft via the coupler 127. The rear pulley 122 residing away from the pusher head 20h can be a timing pulley. The bearings 153 may have through slots or apertures to facilitate wash down.

Referring to FIGS. 8 and 9, the pusher head 20h is attached to a pusher rod (e.g., shaft) 21 which has a cantilevered mounting configuration. The forward end portion of the shaft 21 attached to the pusher head 20k can extend beyond the rails 128 and beyond the forward mounting block 115. In the extended position, the pusher head 20h and forward end of the shaft 21 can extend between about 10-120 inches. The pusher head 20h can have a stroke length that is typically between about 20-100 inches, more typically between about 40-80 inches, such as about 60 inches. When in the fully extended position, the front end of the shaft/pusher head is totally supported from the other end with a two point spaced apart contact via rollers 144r at the nose roller guide and slide rollers 127r residing proximate the forward block 115, typically separated a distance that is between about 5-20 inches, typically about 10 inches, for facilitating concentric alignment of the pusher head 20h with the product chute 60 when fully extended.

Referring again to FIG. 9, the pusher head 20h can have a relatively short and light weight nose "Ln" which provides less mass to this region over conventional pusher heads used for pneumatic-driven pushers. The pusher head nose can be a rigid elastomeric material and have a length Ln of between about 1-6 inches, typically about 1-2 inches, such as about 1.75 inches. The pusher head 20h and can comprise a thermoplastic polymer such as acetal, an example of which is DELRIN® from DuPont.

FIG. 9 also illustrates that a splash or splatter guard 177 such as a plate or screen can be positioned between the pusher head 20h and the forward pulley 122, typically in front of the slide plate 115 or rollers 144r to inhibit splash or splatter of product (e.g., uncooked meat) into the pusher assembly 20 during operation.

The pusher assembly 20 can have programmable operating profiles. In some embodiments, the pusher assembly 20 has Ethernet capability allowing for a remote change of operating profiles and/or servo adjustment. The pusher assembly 20 can have a speed profile which is relatively fast through at least a major portion of the length of the product chute 60 but slows proximate the exit for a "soft stop", then is retracted fast at reset to the home position.

Figure 13A:
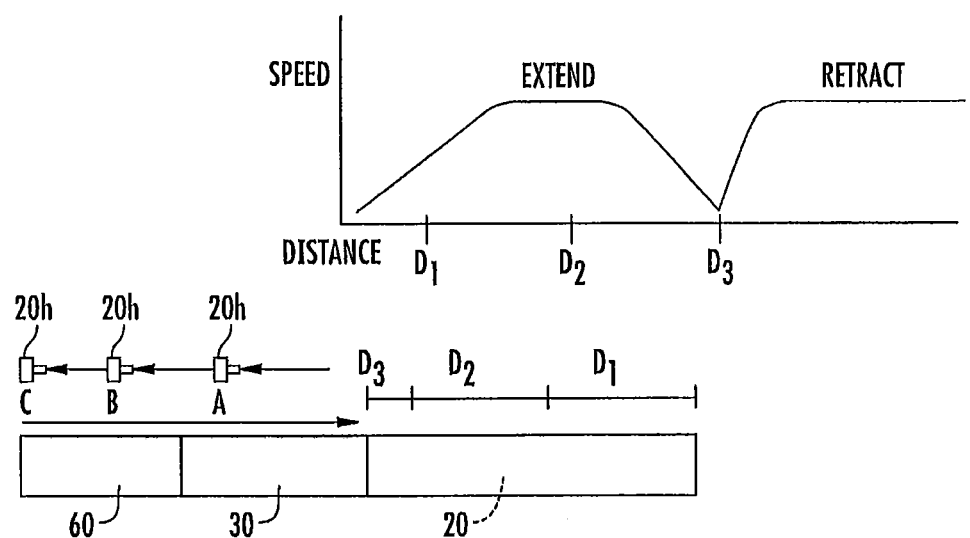
FIG. 13A is a schematic illustration of a pusher mechanism having an exemplary (adjustable) speed profile according to embodiments of the present invention.

FIG. 13A illustrates that the pusher assembly 20 can operate at various speeds at different segments of the pusher stroke. FIG. 13A illustrates three distances that the rear end of pusher shaft 21 can travel during a forward stroke, D1, D2, D3 to move the pusher head 20h through the loading chute 30 and product chute 60 at positions A, B and C. The appended graph illustrates the controlled speed change occurring at the different distances D1, D2, D3. As the shaft 21 approaches D3, associated with a forwardmost portion of the full stroke length, the pusher head speed slows between B and C to more gently push product out the end of the product chute 60 to provide a "soft stop" Ss rather than a "hard stop" which typically occurs with pneumatic systems (e.g., one speed and "full force" at the end of the stroke). The pusher assembly 20 then retracts the pusher head 20h at a high speed for quick reset. The controller may also control the pusher assembly 20 to provide a slow acceleration start, that then can increase using a faster acceleration (e.g., a soft start) at a start portion of the forward and/or rearward travel cycle.

Although shown as three different position (distance) settings and acceleration/deceleration points, two or more than three settings and different speed profiles may be used. The speed profiles may be customized by client or product type.

Figure 13B:
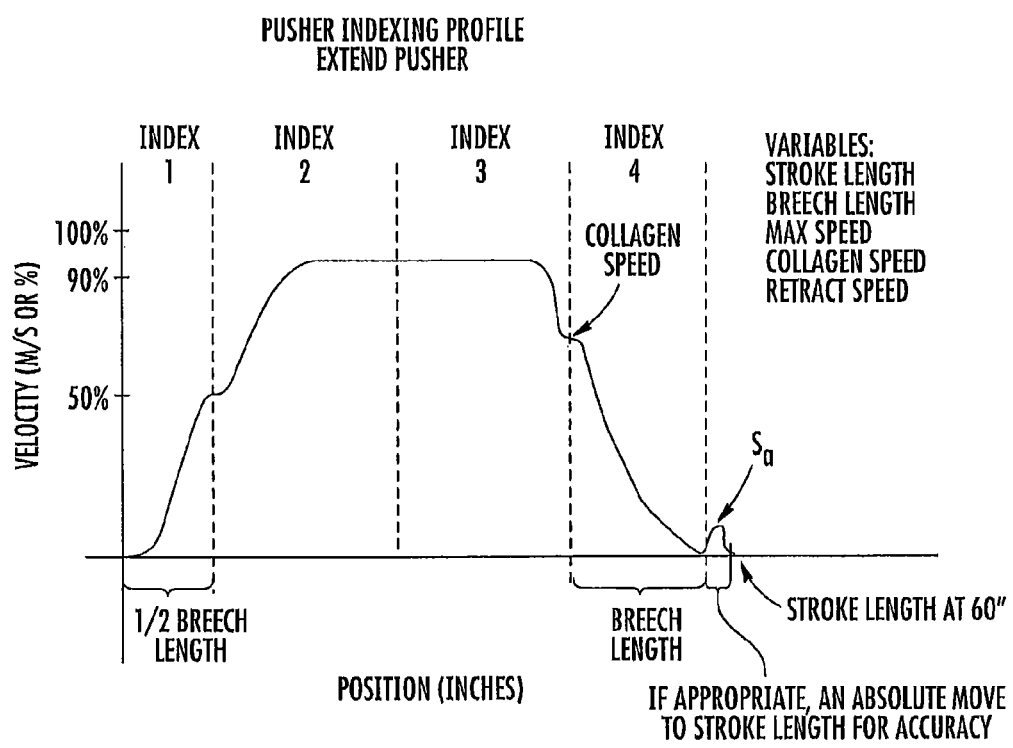
FIG. 13B is a graph of velocity versus position associated with another exemplary pusher indexing profile according to embodiments of the present invention.

FIG. 13B illustrates an exemplary pusher indexing profile for a forward stroke of the pusher head using the motor 120, e.g., servo motor 120s. This profile is particularly suitable for packaging systems that employ edible collagen sheets/film to encase compressed whole muscle meat product to inhibit tearing or rupturing of the collagen film/material. In this embodiment, the velocity or speed is in any suitable units, such as inches/second and 100% reflects an exemplary defined maximum velocity or speed, which in some embodiments can be about 100 inches/second. Other maximums may be used depending on the product being packaged, the pusher assembly and motor/gear box ratio. Typical variables that impact the speed profile include the pusher stroke length, breech length, product chute length, maximum speed, collagen speed and retract speed. As shown, there are four different indexed positions, identified as Index 1, Index 2, Index 3 and Index 4. Index 1 reflects about one-half of the length of the breech chute 30. The pusher head 20h accelerates from home to between Index 1 and Index 2. Between Index 2 and Index 3 the pusher head 20h can move at a substantially constant speed/velocity. At the end of Index 3, the pusher head decelerates for a distance, typically associated with the length of the breech chute 30. At the end of Index 3 and start of Index 4, the velocity/speed can drop to approximate that of the collagen film speed (where used). As indicated by the line representing "Sa", at the forward end of the stroke, the pusher assembly/controller/servo control may carry out an absolute move to provide an accurate full stroke length (for consistency in packaging form). The pusher is then retracted back to a zero position at a high speed, e.g., between about 90-100% speed.

Figure 14:
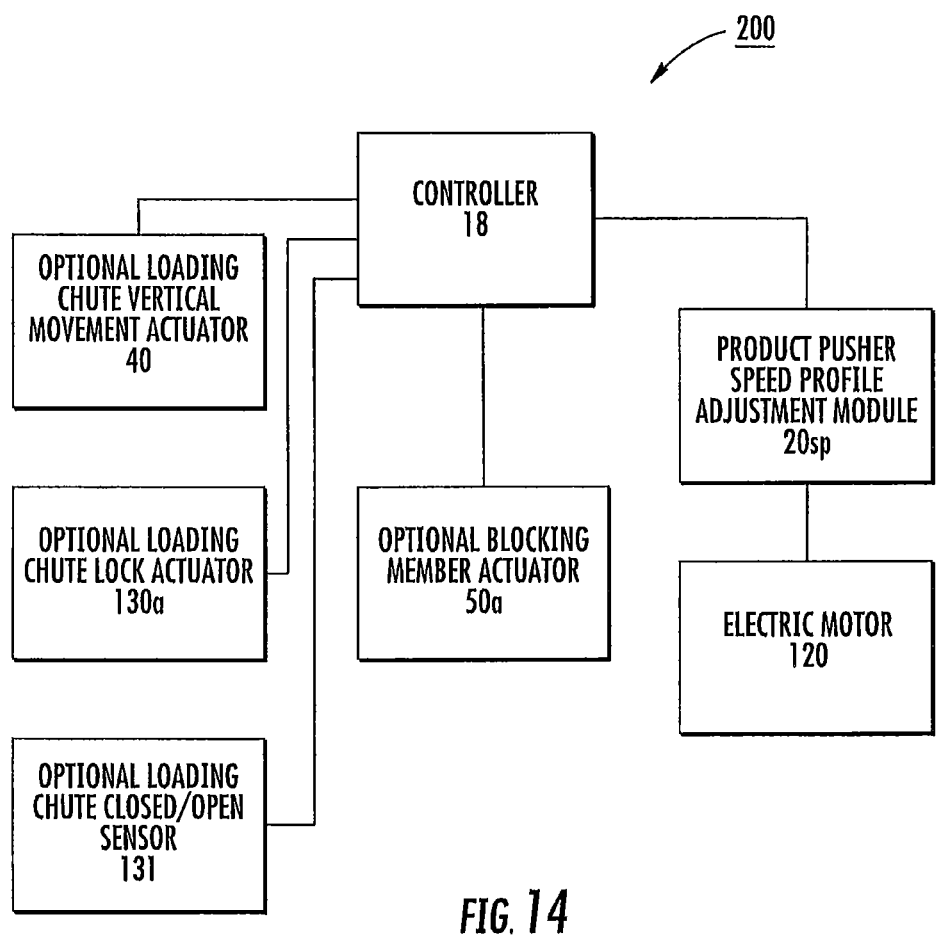
FIG. 14 is a schematic illustration of a control circuit according to embodiments of the present invention.

FIG. 14 is a schematic illustration of a control circuit 200 for the pusher assembly 20 and/or packaging system 10. As shown, the circuit 200 includes a controller 18 (which can be more than one controller and may be remotely controlled or monitored via the Internet or other local or wide area network). The controller 18 communicates with a product pusher speed profile adjustment module 20sp which controls the electric motor 120 (which may optionally be a servo motor 120s) thereby allowing for different index segments and speeds at different stroke distances as discussed above. The controller 18 can optionally communicates with different actuators and sensors 40, 130a, 131 to control operation of features that can promote safe operation and/or speed.

The controller 18 can have a programmatically selectable menu of run modes that are recipe-specific and can include product size as one input parameter to select braking and clipping parameters for automated control, and the like. Accordingly, the loading chute 30 can be provided in a range of different sizes configured to provide the desired product chamber diameter associated with the desired product size (e.g., about a 3 inch diameter chamber of about a 3 inch diameter product).

The system 10 can be configured to run different diameter size products, typically between about 2-9 inches, such as, for example, about 3 inch diameter products up to about 8 or 8.5 inch diameter products, in about 0.5 inch or 1.0 inch increments. The product horn 60 may be provided in different corresponding sizes to match the sizes of the loading chutes 30 (e.g., the diameter when in the cylindrical closed configuration). The netting chute 65 may also be provided in an assortment of suitable sizes to accommodate the different product sizes desired.

A proximity sensor can be used to confirm the position of the pusher head and synchronize the locking or actuation of the blocking member 50, the release of the lock of the chute 30, and the like. The product pusher blocking member 50 can be used to trap the pusher head behind the blocking member 50 when the loading chute 30 is open. For further description of sensors, locks and components useful for some packaging systems, see, U.S. Patent Application Publication No. 2010/0287883, the contents of which are hereby incorporated by reference herein.

Figure 15:
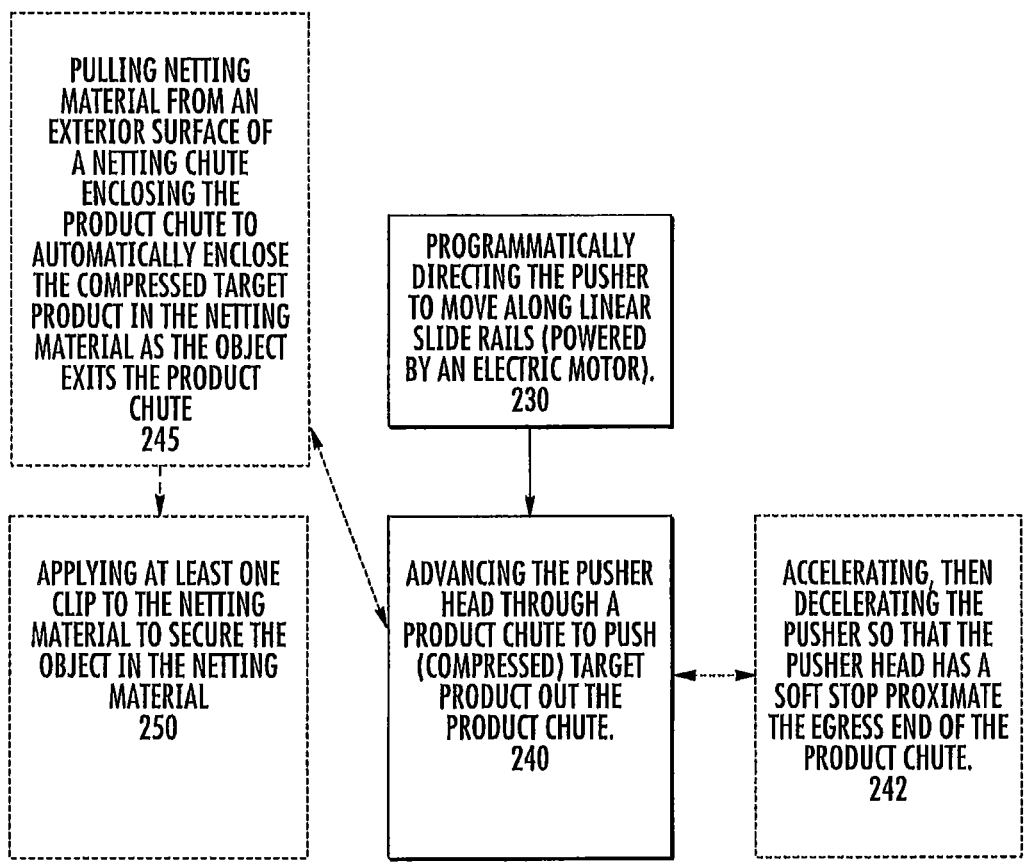
FIG. 15 is a flow diagram of illustrative operations that can be used to carry out embodiments of the present invention.

FIG. 15 is a flow chart of exemplary operations that can be carried out to package product according to embodiments of the present application. As shown, the method includes programmatically directing a pusher with a pusher head to move along linear rails (powered by an electric drive motor) (block 230) and advancing the pusher head through a product chute to push target product out of the product chute (block 240). The advancing step may be carried out to push compressed target product.

The method may also optionally include pulling netting material from an exterior surface of a netting chute enclosing the product chute to automatically enclose the target product in the netting material as the object exits the product chute (block 245); and applying at least one clip to the netting material to secure the object in the netting material (block 250).

Optionally, the method can also include encasing the (compressed) target product in collagen film before enclosing in the netting.

The processes and/or methods can include manual operations including manually sliding the pusher over slide rails using a handle 125h, power on to system, close housing guards. Many of the operations can be carried out under PLC control. That is, a controller/processor 18 (such as a Programmable Logic Controller) may be configured to automatically monitor operational status and conditions through a Servo Control Module and/or a Safety Circuit Module.

Summarizing some particular embodiments, by way of example only and not limited to this exemplary operation or use, an operator can manually place pieces of product, that may be pre-positioned on the side table 37 (FIG. 1), then in the breech loading chute 30. Alternatively, automated loading may also be used (not shown). The product pusher assembly 20 can linearly retract and advance the pusher head along slide rails 128 to push a product through the product chute 60 so that the product is enclosed in netting, then positioned proximate the clipper 90. The product pusher head then retracts to a resting "home" position upstream of the loading chute 30. When the product exits the product chute 60 it is encased/held in the covering material as the covering material is drawn downstream. The clipper then operates so that the covering material may be clipped, welded, fused, knotted or otherwise closed and/or sealed at leading and trailing edge portions thereof.

In some embodiments, meat product is pushed out of the product chute 60 into fragile edible collagen paper or film. The pusher head 20$h$ can be controlled to have a "soft stop" proximate the egress end of the product chute so that the meat exits the product chute with decreased force to inhibit bursting or tears in the collagen paper.

Summarizing some embodiments, the system can optionally electronically extend a gate between the pusher head 20$h$ and chute 30 before an operator is able to open the loading door 31. Once opened, the operator loads discrete whole muscle pieces (or other product) into the loading chute 30, then closes the door 31. The system 10 can automatically lock the door 31, retract the gate, and initiate the pushing cycle. The pusher head 20$h$ pushes whole muscle out of the chute 35 and into netting. The clipper 90 applies clips and the clipped product is held on discharge table 99. Once the pusher head clears the chute 30, the gate is extended and the door 31 is unlocked and opened, ready for an operator to reload the next set of whole muscle meat pieces or other product in cavity.

However, it is noted that a pusher blocking gate is not required, particularly with the electric motor driven pusher system. In addition, the breech loading door closure can be manual or automatic. In some embodiments, an operator can manually close the breech door and the system controller 18 can then automatically lock the door. In some embodiments, the system controller 18 can be configured to use the servo drive's safe-off function (a safety function which prevents torque producing current to the motor), to then initiate the pushing cycle. Thus, in embodiments without the safety gate that use a servo motor, when the breech loading door is unlocked, the servo drive can be disabled and the safe-off function is activated (to prevent torque producing current in the motor).

In some embodiments, the system 10 can have a multi-portion operational mode where the operator loads product, the pusher 20$h$ extends to push the product clear of the breech 30 then retracts and opens the breech 30 allowing the operator to load another product portion. When the desired number of portions have been loaded, the pusher 20$h$ extends fully through the breech chute 30 and product chute 60 and then the clipper 90 applies one or more clips. Thus, in the multi-portion mode, the product can be pushed all the way to the end of the horn 60 or just pushed far enough to clear the breech 30. The clip cycle is not activated until the pusher extends fully after the final portion is loaded. An operator can indicate to the HMI and/or controller 18 that all (or the final) partial portions have been loaded or a preset number, of partial load cycles can be input or selected for automatic operation of the partial and full push cycle extensions. The electric motor 120 (preferably servo motor 120$s$) drive system can provide better control over pneumatic systems in multi-portion mode.

Figure 16:
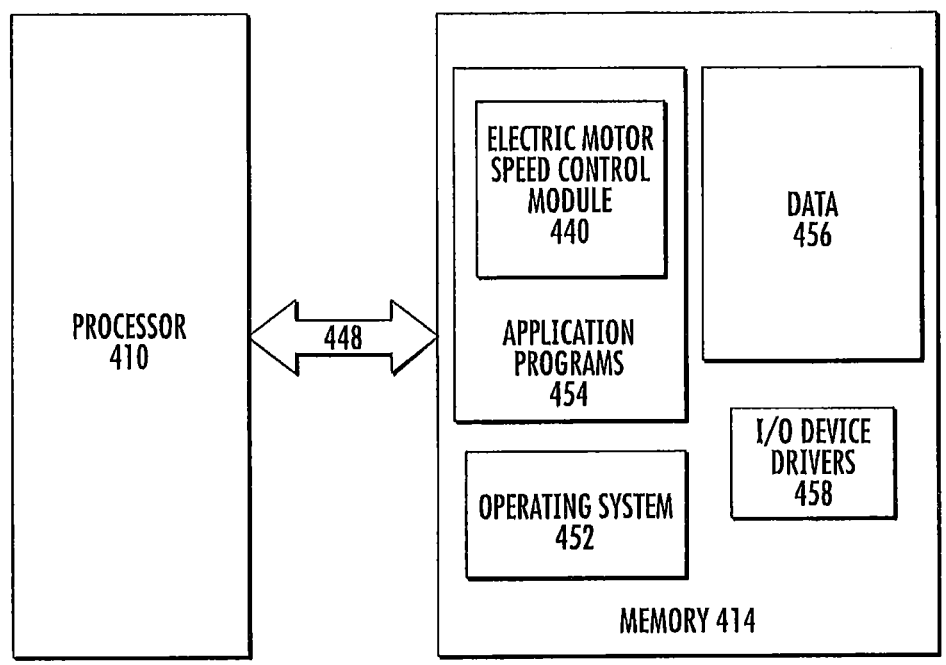
FIG. 16 is a block diagram of data processing system/computer program according to embodiments of the present invention.

FIG. 16 is a block diagram of exemplary embodiments of data processing systems that illustrate systems, methods, and computer program products in accordance with embodiments of the present invention. The data processing systems may be incorporated in a programmable logic controller and/or digital signal processor in communication with the HMI. The processor 410 communicates with the memory 414 via an address/data bus 448. The processor 410 can be any commercially available or custom microprocessor. The memory 414 is representative of the overall hierarchy of memory devices containing the software and data used to implement the functionality of the data processing system. The memory 414 can include, but is not limited to, the following types of devices: cache, ROM, PROM, EPROM, EEPROM, flash memory, SRAM, and DRAM.

As shown in FIG. 16, the memory 414 may include several categories of software and data used in the data processing system: the operating system 452; the application programs 454; the input/output (I/O) device drivers 458; the Electric Drive Control Module 440 which may be in communication with the data 456. The Control Module 440 can be configured to allow for different speeds to be used along different portions of the pusher stroke cycle (e.g., fast and/or full speed reverse, adjustable forward speeds). The Electric Drive may direct a servo motor.

The data 456 may include a look-up chart of different products (e.g., a "recipe" driven menu of operational parameters), covering material, proximity sensor feedback, cavity size (vertical movement), pressure data, safety interlock circuits and the like corresponding to particular or target products for one or more producers, which may allow additional force to cut the gathered material and/or time the cutting to a desired cycle for a shift and/or production run and the like.

As will be appreciated by those of skill in the art, the operating system 452 may be any operating system suitable for use with a data processing system, such as Rockwell Automation Logix, Siemens Simatic, Mitsubishi PLC operating system or any PLC operating system, OS/2, AIX, DOS, OS/390 or System390 from International Business Machines Corporation, Armonk, N.Y., Windows CE, Windows NT, Windows95, Windows98 or Windows2000 from Microsoft Corporation, Redmond, Wash., Unix or Linux or FreeBSD, Palm OS from Palm, Inc., Mac OS from Apple Computer, LabView, or proprietary operating systems. The I/O device drivers 458 typically include software routines accessed through the operating system 452 by the application programs 454 to communicate with devices such as I/O data port(s), data storage 456 and certain memory 414 components. The application programs 454 are illustrative of the programs that implement the various features of the data processing system and can include at least one application, which supports operations according to embodiments of the present invention. Finally, the data 456 represents the static and dynamic data used by the application programs 454, the operating system 452, the I/O device drivers 458, and other software programs that may reside in the memory 414.

While the present invention is illustrated, for example, with reference to the Module 440 being an application program in FIG. 16, as will be appreciated by those of skill in the art, other configurations may also be utilized while still benefiting from the teachings of the present invention. For example, the Module 440 may also be incorporated into the operating system 452, the I/O device drivers 458 or other such logical division of the data processing system. Thus, the present invention should not be construed as limited to the configurations of FIG. 16 which is intended to encompass any configuration capable of carrying out the operations described herein. Further, the Module 440 can be used to operate other apparatus that may employ other chutes with or without automated pushers.

The I/O data port can be used to transfer information between the data processing system, the product pusher, the clipper to another computer system or a network (e.g., the Internet) or to other devices controlled by the processor. These components may be conventional components such as those used in many conventional data processing systems which may be configured in accordance with the present invention to operate as described herein.

The Module 440 can be configured to monitor at least one signal from a loading chute to allow for easier loading of product into the product chamber when the ceiling is open and automatically direct an actuator to move at least one of the ceiling or floor vertically to an operative position after signal data confirms that the ceiling is closed.

The Module 440 can communicate with a another local, remote and/or on-board module to (or may itself be configured to) adjust speeds and/or automatically lock and unlock a lock operatively associated with the ceiling in a closed configuration, e.g., directing the lock to unlock in the loading configuration to allow a user to open the ceiling for loading after the product pusher is retracted and the blocking guard has been extended.

While the present invention is illustrated, for example, with reference to particular divisions of programs, functions and memories, the present invention should not be construed as limited to such logical divisions. Thus, the present invention should not be construed as limited to the configuration of FIG. 17 but is intended to encompass any configuration capable of carrying out the operations described herein.

The flowcharts and block diagrams of certain of the figures herein illustrate the architecture, functionality, and operation of possible implementations of safety and/or diagnostic systems according to the present invention. In this regard, each block in the flow charts or block diagrams represents a module, segment, or portion of code, which comprises one or more executable instructions for implementing the specified logical function(s). It should also be noted that in some alternative implementations, the functions noted in the blocks may occur out of the order noted in the figures. For example, two blocks shown in succession may in fact be executed substantially concurrently or the blocks may sometimes be executed in the reverse order, depending upon the functionality involved.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clauses, where used, are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. A computer program product for operating an automated or semi-automated packaging system having a product chute and a film forming system that converts flat sheet stock to tubular film, the computer program product comprising:
   a non-transitory computer readable storage medium having computer readable program code embodied in said medium, said computer-readable program code comprising:
   computer readable program code that directs a product pusher assembly with a pusher head and servo motor to drive the pusher head through a stroke cycle with a speed profile that accelerates the pusher head from at least one of a home or retracted stop position to a first speed for a first distance then decelerates the pusher head to a speed that corresponds with a film speed of the tubular film, then continues to decelerate to a stop position associated with a forward end portion of the stroke cycle; and
   computer readable program code that directs the servo motor to move the pusher head a distance beyond the stop location to carry out an absolute move of stroke length to provide an accurate full stroke length for consistency in packaging.

2. The computer program product of claim 1, wherein the servo motor is in communication with a gear box having an output rotor that is attached to a linear drive assembly to drive the linear drive assembly to reciprocate the pusher head between extended and retracted positions, and wherein the computer program product defines the speed profile so that the linear drive assembly accelerates to return the pusher head to the retracted position after it decelerates the pusher head to the slower speed at the forward end portion of the stroke cycle.

3. The computer program product of claim 2, wherein the servo motor and gear box cooperate with the pusher head to generate between about 100-400 lbf of force to push target product through a product chute.

4. The computer program product of claim 2, wherein the linear drive assembly comprises a belt held by a pulley with a drive shaft, and wherein the gear box has a rotor that is attached to and turns the drive shaft to move a slide assembly attached to a pusher shaft holding the pusher head along horizontally oriented, laterally spaced apart rails.

5. A computer program product for operating an automated or semi-automated packaging system having a product chute and a film forming system that converts flat sheet stock to tubular film, the computer program product comprising:
   a non-transitory computer readable storage medium having computer readable program code embodied in said medium said computer-readable program code comprising:
   computer readable program code that directs a product pusher assembly with a pusher head and electric motor to drive the pusher head through a stroke cycle with a speed profile that accelerates the pusher head from at least one of a home or retracted stop position to a first speed for a first distance then decelerates the pusher head to a speed that corresponds with a film speed of the tubular film, then continues to decelerate to a stop position associated with a forward end portion of the stroke cycle, wherein the speed profile defines a reset speed for the pusher head to retract the pusher head to a retracted position after the forward end portion of the stroke at the reset speed, and wherein the reset speed is faster than a forward speed of the stroke cycle before the deceleration to return the pusher head to the retracted position.

6. A computer program product for operating an automated or semi-automated packaging system, the computer program product comprising:

a non-transitory computer readable storage medium having computer readable program code embodied in said medium, said computer-readable program code comprising:

computer readable program code that defines a speed profile for a pusher head with a forward stroke movement that accelerates from an at-rest home position to a constant velocity over a first distance, then holds the constant velocity for a second distance, then decelerates over a third distance at a forward end portion of a stroke cycle to a stop position, then retracts the pusher head to the home position with a reset speed associated with a retraction speed of the pusher head that is faster than the forward speed of the stroke cycle before the deceleration at the forward end portion of the stroke cycle.

7. The computer program product of claim 6, wherein the pusher head is attached to an elongate shaft of a linear drive system, the drive system comprising a servo motor and gear box that powers the linear drive system, wherein the speed profile of the stroke cycle is configured to reciprocate the pusher head between home and extended positions, and wherein the computer readable program code that defines the speed profile is configured to provide adjustable different stroke index distances to select the first, second and third distances and a forward stroke length.

8. The computer program product of claim 6, further comprising computer readable program code that provides adjustable inputs defining the speed profile including a plurality of one or more of stroke length, breech length, maximum speed, casing speed and a retract speed as variable parameters.

9. The computer program product of claim 8, wherein the computer readable program code that provides the adjustable inputs includes all the variable parameters as the adjustable inputs.

10. The computer program product of claim 6, wherein the computer readable program code that provides the speed profile initially decelerates the pusher head speed to correspond to a film speed before further decelerating to the stop position.

11. The computer program product of claim 6, wherein the computer program product further comprises computer readable program code that directs the pusher head to move forward a distance beyond the stop position to carry out an absolute positional movement to stroke length to thereby provide an accurate full stroke length for consistency in packaging.

12. A computer program product for operating an automated or semi-automated packaging system with a reciprocating pusher head and a breech loading chute aligned with a product chute, the computer program product comprising:

a non-transitory computer readable storage medium having computer readable program code embodied in said medium, said computer-readable program code comprising:

computer readable program code that advances the pusher head in a product chute by automatically accelerating the pusher head from at least one of a home or rest position to travel at a constant speed for a distance that is less than a length of the breech loading chute, then automatically adjusting the speed of the pusher head to slow down before the pusher head reaches an open discharge end of the product chute to stop at a defined forward stroke length to discharge product into a casing using a soft stop to thereby inhibit tear or rupture of the casing.

13. The computer program product of claim 12, wherein the pusher head is attached to a linear drive system that comprises an electric motor.

14. The computer program product of claim 13, wherein the electric motor is a servo motor, and wherein the servo motor is connected to a gear box attached to the linear drive system at a location residing upstream of but proximate the breech loading chute.

15. The computer program product of claim 14, wherein the computer readable program code that advances the pusher head in a product chute by adjusting the speed is configured to adjust the speed using a speed profile associated with the servo motor, and wherein the speed profile comprises at least three different defined operational indexes associated with different sub-lengths of the defined forward stroke length.

16. The computer program product of claim 15, wherein the speed profile defines a reset speed associated with a retraction speed of the pusher head to a home position from a stop position associated with the forward stroke length that is faster than a maximal forward speed of the stroke cycle to return the pusher head to the home position.

17. The computer program product of claim 12, further comprising computer readable program code that provides adjustable inputs defining a speed profile including one or more of stroke length, breech length, maximum speed, casing speed and a retract speed as variable parameters.

18. The computer program product of claim 17, wherein the computer readable program code that provides the adjustable inputs includes a plurality of the variable parameters as the adjustable inputs.

19. The computer program product of claim 12, wherein the computer readable program code that provides the speed profile initially decelerates the pusher head speed to correspond to a film speed before further decelerating to the stop position.

20. The computer program product of claim 12, wherein the computer program product further comprises computer readable program code that directs the pusher head to move forward a distance beyond the stop at the defined forward stroke length to carry out an absolute positional movement to thereby provide an accurate full stroke length for consistency in packaging.

* * * * *